(12) United States Patent
Ye et al.

(10) Patent No.: US 11,615,099 B2
(45) Date of Patent: Mar. 28, 2023

(54) METHOD AND APPARATUS FOR COLLECTING KEY-VALUE PAIR DATA

(71) Applicants: Huawei Technologies Co., Ltd., Shenzhen (CN); The Hong Kong Polytechnic University, Hong Kong (CN)

(72) Inventors: Qingqing Ye, Hong Kong (CN); Haibo Hu, Hong Kong (CN)

(73) Assignees: Huawei Technologies Co., Ltd., Shenzhen (CN); The Hong Kong Polytechnic University, Hong Kong (CN)

( * ) Notice: Subject to any disclaimer, the term of this patent is extended or adjusted under 35 U.S.C. 154(b) by 108 days.

(21) Appl. No.: 17/108,780

(22) Filed: Dec. 1, 2020

(65) Prior Publication Data
US 2021/0081412 A1 Mar. 18, 2021

Related U.S. Application Data

(63) Continuation of application No. PCT/CN2019/108900, filed on Sep. 29, 2019.

(30) Foreign Application Priority Data

Sep. 30, 2018 (CN) .......................... 201811161746.5

(51) Int. Cl.
*G06F 16/00* (2019.01)
*G06F 16/2458* (2019.01)
(Continued)

(52) U.S. Cl.
CPC ...... *G06F 16/2458* (2019.01); *G06F 16/2228* (2019.01); *G06F 16/2365* (2019.01)

(58) Field of Classification Search
None
See application file for complete search history.

(56) References Cited

U.S. PATENT DOCUMENTS 9,712,550 B1 7/2017 Thakurta et al.
9,942,206 B1 4/2018 Miller et al.
(Continued)

FOREIGN PATENT DOCUMENTS

CN 102724106 A 10/2012
CN 104135362 A 11/2014
(Continued)

OTHER PUBLICATIONS

Nguyen et al., "Collecting and Analyzing Data from Smart Device Users with Local Differential Privacy," arXiv:1606.05053v1 [cs.DB], total 11 pages (Jun. 16, 2016).
(Continued)

*Primary Examiner* — Anhtai V Tran
(74) *Attorney, Agent, or Firm* — Leydig, Voit & Mayer, Ltd.

(57) ABSTRACT

A method and an apparatus for sending key-value pair data are provided, and a method and an apparatus for collecting key-value pair data are provided. In the method, first target key-value pair data is perturbed as first perturbed key-value pair data, so that a data collector can determine, based on a value a or b of a first value in the first perturbed key-value pair data, whether to include the entire first perturbed key-value pair data into the statistical result in a process of generating the statistical result. In this way, an association between a value and a key in the key-value pair data is reserved in the first perturbed key-value pair data, which improves availability of the first perturbed key-value pair data. That is, a statistical result generated by the data collector based on the first perturbed key-value pair data is
(Continued)

closer to a statistical result generated based on original user key-value pair data.

20 Claims, 5 Drawing Sheets

(51) Int. Cl.
*G06F 16/22* (2019.01)
*G06F 16/23* (2019.01)

(56) References Cited

U.S. PATENT DOCUMENTS

| | | | |
|---|---|---|---|
| 10,789,363 B1* | 9/2020 | Gursoy | G06F 21/6254 |
| 10,795,999 B1* | 10/2020 | Gursoy | G06F 21/567 |
| 2014/0301553 A1 | 10/2014 | Salgado et al. | |
| 2016/0248583 A1* | 8/2016 | McClanahan | G06F 21/78 |
| 2017/0293772 A1 | 10/2017 | Chen et al. | |
| 2017/0316346 A1 | 11/2017 | Park et al. | |

FOREIGN PATENT DOCUMENTS

| | | |
|---|---|---|
| CN | 104408176 A | 3/2015 |
| CN | 104735166 A | 6/2015 |
| CN | 105893483 A | 8/2016 |
| CN | 107423636 A | 12/2017 |
| CN | 107862220 A | 3/2018 |
| CN | 109063502 A | 12/2018 |

OTHER PUBLICATIONS

Ye et al., "PrivKV: Key-Value Data Collection with Local Differential Privacy," 2019 IEEE Symposium on Security and Privacy, pp. 317-331, Institute of Electrical and Electronics Engineers, New York, New York (2019).

Dwork et al., "Differential Privacy and Robust Statistics," STOC '09: Proceedings of the forty-first annual ACM symposium on Theory of computing, pp. 371-380 (May 31-Jun. 2, 2009).

Duchi et al., "Local Privacy and Statistical Minimax Rates," 2013 IEEE 54th Annual Symposium on Foundations of Computer Science, pp. 429-438, Institute of Electrical and Electronics Engineers, New York, New York (2013).

Erlingsson et al., "RAPPOR: Randomized Aggregatable Privacy-Preserving Ordinal Response," CCS '14, Proceedings of the 2014 ACM SIGSAC Conference on Computer and Communications Security, pp. 1054-1067 (Nov. 2014).

CN/201811161746.5, Office Action and Search Report, dated Oct. 14, 2022.

Ye Qing-Qing et al., "Survey on Local Differential Privacy," Journal of Software, vol. 29, No. 7, Total 66 pages (Jul. 2018). With a machine translation.

* cited by examiner

METHOD AND APPARATUS FOR COLLECTING KEY-VALUE PAIR DATA

CROSS-REFERENCE TO RELATED APPLICATIONS

This application is a continuation of International Application No. PCT/CN2019/108900, filed on Sep. 29, 2019, which claims priority to Chinese Patent Application No. 201811161746.5, filed on Sep. 30, 2018. The disclosures of the aforementioned applications are hereby incorporated by reference in their entireties.

TECHNICAL FIELD

This application relates to the field of information security technologies, and more specifically, to a method and an apparatus for collecting key-value pair data.

BACKGROUND

Users may report respective user data to a data collector by using user equipments (UE), so that the data collector collects data statistics with reference to the user data reported by the user equipments, so as to support some special data mining tasks. For example, after large-scale hospitals nationwide work as user equipments and report respective diagnostic data to the data collector, a research group may establish a propagation model of a special case from a statistical result of the data collector.

In a process of collecting the user data by the data collector, to protect user privacy, a local differential privacy (LDP) technology may be used, and the user equipment perturbs data that needs to be reported and then reports perturbed data to the data collector. The data collector collects statistics based on the perturbed data by using a specific algorithm, to obtain a statistical result. The specific algorithm may ensure that the statistical result obtained based on the perturbed data is similar to a statistical result obtained based on unperturbed data (that is, original data). In this way, because the data collector does not need to collect the original data of the user equipment, a possibility of obtaining original data of each user at the data collector by an attacker is minimized.

Currently, the local differential privacy mechanism is mainly used to perturb numerical data or discrete data. However, with widespread application of key-value (KV) data, in consideration that each key-value pair (KV pair) of key-value pair data includes both discrete data (that is, key) and numerical data (that is, value), a local differential privacy technology for the key-value pair data is urgently needed to ensure an association relationship between the key and the value while perturbing the key and the value.

SUMMARY

This application provides a method and an apparatus for collecting key-value pair data, so as to ensure an association relationship between a key and a value in the key-value pair data in a process of perturbing the key-value pair data.

According to a first aspect, a method for collecting user key-value pair data is provided, including: obtaining first target key-value pair data $\langle k_1, v_1 \rangle$, where $k_1$ is a value of a key in the first target key-value pair data, and $v_1$ is a value of a value in the first target key-value pair data; and sending, to a data collector, first perturbed key-value pair data $\langle K_1^*, V_1^* \rangle$ obtained after the first target key-value pair data is perturbed, where a value of the first perturbed key-value pair data $\langle K_1^*, V_1^* \rangle$ is randomly set to $\langle a, v_1^* \rangle$ or $\langle b, v \rangle$ based on a preset probability, $v_1^*$ is obtained by perturbing $v_1$, all of a, b, and v are preset values, and a and b are different values.

When the value of the first perturbed key-value pair data $\langle K_1^*, V_1^* \rangle$ is $\langle a, v_1^* \rangle$, that is, a first value $K_1^*$ of the first perturbed key-value pair data is a, it indicates that the first perturbed key-value pair data is valid data, and the first value $K_1^*$ and a second value $V_1^*$ in the first perturbed key-value pair data are included into a statistical result generated by the data collector.

When the value of the first perturbed key-value pair data $\langle K_1^*, V_1^* \rangle$ is $\langle b, v \rangle$, that is, the first value $K_1^*$ of the first perturbed key-value pair data is b, it indicates that the first perturbed key-value pair data is invalid data, or in this case, it may be considered that the first perturbed key-value pair data is null, that is, user equipment does not record the key-value pair data. The first value $K_1^*$ and the second value $V_1^*$ in the first perturbed key-value pair data are not included into the statistical result generated by the data collector. For example, $\langle b, v \rangle$ may be $\langle 0, 0 \rangle$.

In this embodiment of this application, the first target key-value pair data is perturbed as the first perturbed key-value pair data, and the value of the first perturbed key-value pair data is randomly set to $\langle a, v_1^* \rangle$ or $\langle b, v \rangle$ based on the preset probability, so that the data collector can determine, based on the value a or b of the first value in the first perturbed key-value pair data, whether to include the entire first perturbed key-value pair data into the statistical result in a process of generating the statistical result. In this way, an association between the value and the key in the key-value pair data is reserved in the first perturbed key-value pair data, which improves availability of the first perturbed key-value pair data. That is, the statistical result generated by the data collector based on the first perturbed key-value pair data is closer to a statistical result generated based on original user key-value pair data.

In a possible implementation, randomly setting the value of the first perturbed key-value pair data $\langle k_1^*, V_1^* \rangle$ to $\langle a, v_1^* \rangle$ or $\langle b, v \rangle$ based on the preset probability includes: perturbing the first target key-value pair $\langle k_1, v_1 \rangle$ based on a privacy budget parameter $\varepsilon_1$ and by using a first differential privacy model, to obtain the first perturbed key-value pair data $\langle K_1^*, V_1^* z, 26 \rangle$, where the first differential privacy model is $$\langle K_1^*, V_1^* \rangle = \begin{cases} \langle a, v_1^* \rangle & w.p. \ \dfrac{e^{\varepsilon_1}}{1+e^{\varepsilon_1}} \\ \langle b, v \rangle & w.p. \ \dfrac{1}{1+e^{\varepsilon_1}} \end{cases}.$$

In a possible implementation, the obtaining first target key-value pair data $\langle k_1, v_1 \rangle$ includes: selecting a target key from a first key set, where the first key set includes a key in key-value pair data to be collected by the data collector; and when the target key belongs to a second key set, selecting, as the first target key-value pair data, key-value pair data that includes the target key from key-value pair data recorded by the user equipment, where the second key set includes a key in the key-value pair data recorded by the user equipment.

The target key is any key in the first key set.

The first key set may include one or more different keys.

In this embodiment of this application, the target key is selected from the first key set to be collected. In this case, the target key may be a key in key-value pair data really collected by the user equipment, or the target key may not be the key in the key-value pair data really collected by the user equipment, thereby improving privacy of the key-value pair data.

In a possible implementation, the method further includes: when the target key does not belong to the second key set, sending second perturbed key-value pair data $\langle K_2^*, V_2^* \rangle$ to the data collector, where a value of the second perturbed key-value pair data $\langle K_2^*, V_2^* \rangle$ is randomly set to $\langle a, v_2^* \rangle$ or $\langle b, v \rangle$ based on the preset probability, and $v_2^*$ is obtained by perturbing a preconfigured target value $v_2$.

In a possible implementation, randomly setting the value of the second perturbed key-value pair data $\langle K_2^*, V_2^* \rangle$ to $\langle a, v_2^* \rangle$ or $\langle b, v \rangle$ based on the preset probability includes: perturbing second target key-value pair data based on the privacy budget parameter $\varepsilon_1$ and by using a second differential privacy model, to obtain the second perturbed key-value pair data $\langle K_2^*, V_2^* \rangle$, where the second differential privacy model is $$\langle K_2^*, V_2^* \rangle = \begin{cases} \langle b, v \rangle \ w.p. \ \frac{e^{\varepsilon_1}}{1+e^{\varepsilon_1}} \\ \langle a, v_2^* \rangle \ w.p. \ \frac{1}{1+e^{\varepsilon_1}} \end{cases},$$

a key in the second target key-value pair data is the target key, and a value in the second target key-value pair data is $v_2^*$.

In a possible implementation $\langle b, v \rangle$ is $\langle 0, 0 \rangle$, and a is a real number that is not zero.

In a possible implementation, the method further includes: receiving the target value $v_2$ returned by the data collector, where the target value $v_2$ is a mean of values that are corresponding to the target key and historically collected by the data collector.

In a possible implementation, the selecting a target key from a first key set includes: selecting the target key from the first key set through random sampling.

In the first differential privacy model and the second differential privacy model described above, it can be learned that the probability value $$\frac{e^{\varepsilon_1}}{1+e^{\varepsilon_1}} \ f \ \frac{1}{1+e^{\varepsilon_1}}.$$

That is, for the target key belonging to the second key set, a probability that the first target key-value pair data including the target key is perturbed as $\langle a, v_1^* \rangle$ is higher than a probability that the first target key-value pair data including the target key is perturbed as $\langle b, v \rangle$, or a probability that the value of the first perturbed key-value pair data is $\langle a, v_1^* \rangle$ is higher than a probability that the value of the first perturbed key-value pair data is $\langle b, v \rangle$. For the target key that does not belong to the second key set, a probability that the value of the second perturbed key-value pair data is $\langle b, v \rangle$ is higher than a probability that the second perturbed key-value pair data is perturbed as $\langle a, v_2^* \rangle$. In this way, the statistical result collected by the data collector is closer to the statistical result obtained based on the original key-value pair data.

According to a second aspect, a method for collecting statistics on user key-value pair data is provided, including:

obtaining a perturbed key-value pair data set, where the perturbed key-value pair data set includes a plurality of pieces of perturbed key-value pair data sent by a plurality of user equipments, the plurality of pieces of perturbed key-value pair data are used to collect statistics on frequency of a target key and a mean of values corresponding to the target key, each piece of perturbed key-value pair data includes a first value K* and a second value V*, a value of each piece of perturbed key-value pair data $\langle K^*, V^* \rangle$ is randomly set to $\langle a, v_1^* \rangle$ or $\langle b, v \rangle$ based on a preset probability, $v_1^*$ is obtained by perturbing a value $v_1$ recorded by the user equipment, all of a, b, and v are preset values, and a and b are different values;

collecting statistics on frequency of the target key in the key-value pair data set based on first values in the perturbed key-value pair data set; and collecting statistics on a mean of values corresponding to the target key in the key-value pair data set based on second values in the perturbed key-value pair data set.

In this embodiment of this application, the value of each piece of perturbed key-value pair data $\langle K^*, V^* \rangle$ is randomly set to $\langle a, v_1^* \rangle$ or $\langle b, v \rangle$ based on the preset probability, so that the data collector can determine, based on the value a or b of the first value in the perturbed key-value pair data, whether to include the entire perturbed key-value pair data into the statistical result in a process of generating the statistical result. In this way, an association between the value and the key in the key-value pair data is reserved in the perturbed key-value pair data, which improves availability of the perturbed key-value pair data. That is, the statistical result generated by the data collector based on the perturbed key-value pair data is closer to a statistical result generated based on original user key-value pair data.

In a possible implementation, the frequency of the target key is a ratio of a quantity of third perturbed key-value pair data to a quantity of the plurality of user equipments, and the third perturbed key-value pair data is perturbed key-value pair data whose first value K* is a in the perturbed key-value pair data set; and the mean of the values corresponding to the target key is a ratio of a sum of second values in the third perturbed key-value pair data to the quantity of the third perturbed key-value pair data.

In a possible implementation, the method further includes:

calibrating the frequency f of the target key based on a frequency calibration model to obtain calibrated frequency f* of the target key, where the frequency calibration model is $$f^* = \frac{p-1+f}{2p-1}, \text{ where } p = \frac{e^{\varepsilon_1}}{e^{\varepsilon_1}+1},$$

and $\varepsilon_1$ represents a privacy budget parameter used for generating the perturbed key-value pair data based on a differential privacy model.

In this embodiment of this application, the frequency of the target key is calibrated by using the frequency calibration model, which helps improve accuracy of the frequency of the target key.

In a possible implementation, the second value in the third perturbed key-value pair data is −v or v, and the method further includes:

separately collecting statistics on a first quantity $n_1$ of perturbed key-value pairs whose second values are −v in the perturbed key-value pair data set and a second quantity $n_2$ of perturbed key-value pairs whose second values are v in the perturbed key-value pair data set;

by using a first mean calibration model, calibrating the first quantity $n_1$ to obtain a third quantity $n_1^*$, and calibrating the second quantity $n_2$ to obtain a fourth quantity $n_2^*$, where the first mean calibration model is $$n_1^* = \frac{p-1}{2p-1} \cdot N + \frac{n_1}{2p-1}, n_2^* = \frac{p-1}{2p-1} \cdot N + \frac{n_2}{2p-1}, p = \frac{e^{\varepsilon_2}}{e^{\varepsilon_2}+1},$$

and $\varepsilon_2$ represents a privacy budget parameter used for perturbing the value in the recorded user key-value pair data by using the differential privacy model by the user equipment.

In this embodiment of this application, the mean of the target key is calibrated by using the first mean calibration model, which helps improve accuracy of the mean of the target key.

In a possible implementation, the quantity of the third perturbed key-value pair data is N, and the method further includes:

calibrating the third quantity $n_1^*$ and the fourth quantity $n_2^*$ if the third quantity $n_1^*>N$ or the fourth quantity $n_1^*<0$, so that a sum of the third quantity $n_1^*$ and the fourth quantity $n_2^*$ is the quantity of the third perturbed key-value pair data.

In a possible implementation, the calibrating the third quantity $n_1^*$ and the fourth quantity $n_2^*$ if the third quantity $n_1^*>N$ or the fourth quantity $n_1^*<0$ includes:

calibrating the third quantity $n_1^*$ and the fourth quantity $n_2^*$ by using a second mean calibration model if the third quantity $n_1^*>N$ or the fourth quantity $n_1^*0$, where the second mean calibration model is $$n_1^* = \frac{(1+m)N}{2},$$

$n_2^*=N-n_1^*$, and m represents the pre-determined mean of the target key.

In this embodiment of this application, the mean of the target key is calibrated by using the second mean calibration model, which helps improve accuracy of the mean of the target key.

In a possible implementation, the method further includes: sending the mean of the target key to the plurality of user equipments.

In a possible implementation, the mean of the target key is the mean of the target key that is obtained in a Qth round of statistical process, Q is a positive integer, and the sending the mean of the target key to the plurality of user equipments includes: if a communication cost $A_0$ is less than or equal to a statistical precision loss F, sending the mean of the target key to the plurality of user equipments, where the communication cost $A_0$ is used to indicate a communication cost of communication between the data collector and the user equipment, the statistical precision loss is $$F = \frac{1}{|K|} \sum_{k \in K} |m_1 - m_2|,$$

$|K|$ represents a quantity of keys to be collected by the data collector, $m_1$ represents the mean of the target key that is collected by the data collector, $m_2$ represents a mean of the target key that is historically collected by the data collector, and k represents the target key.

In this embodiment of this application, a relationship between the communication cost $A_0$ and the statistical precision loss F is determined to determine whether to continue to send the mean of the target key to the plurality of user equipments, so as to improve precision of the statistical result, thereby facilitating balancing between the communication cost $A_0$ and the statistical precision loss F.

In a possible implementation, the method further includes: if the communication cost $A_0$ is greater than the statistical precision loss $F^*$, stopping sending the mean of the target key that is collected by the data collector to the plurality of user equipments.

In this embodiment of this application, a relationship between the communication cost $A_0$ and the statistical precision loss F is determined to determine whether to continue to send the mean of the target key to the plurality of user equipments, so as to improve precision of the statistical result, thereby facilitating balancing between the communication cost $A_0$ and the statistical precision loss F.

In a possible implementation, the method further includes:

predicting a predicted mean $m^*$ of the values corresponding to the target key based on the mean m collected by the data collector and a mean prediction model, where the mean prediction model is used to indicate a change rule of the mean of the values corresponding to the target key in a process in which the data collector collects statistics on the mean of the values corresponding to the target key in a plurality of rounds of statistics collection.

In a possible implementation, the mean prediction model is $$m^* = m + \frac{(m^{(1)}-m)(1-\theta^c)}{1-\theta}, \text{ where } \theta = \frac{f^*p - f^* - p + 1}{2f^*p - f^* - p + 1}, p = \frac{e^{\frac{\varepsilon_2}{2}}}{1+e^{\frac{\varepsilon_2}{2}}},$$

c represents a quantity of rounds that the mean prediction model is used to predict the mean $m^*$ of the values corresponding to the target key, $\varepsilon_2$ represents a privacy budget parameter used when the user equipment perturbs the value in the recorded user key-value pair data by using the differential privacy model, and $m^{(1)}$ represents an initial mean of the values corresponding to the target key.

In this embodiment of this application, the mean of the target key is determined based on the mean prediction model, which helps improve accuracy of the statistical result.

According to a third aspect, an apparatus for sending user key-value pair data is provided, including: an obtaining module, configured to obtain first target key-value pair data $\langle k_1,v_1 \rangle$, where $k_1$ is a value of a key in the first target key-value pair data, and $v_1$ is a value of a value in the first target key-value pair data; and a sending module, configured to send, to a data collector, first perturbed key-value pair data $\langle K_1^*,V_1^* \rangle$ obtained after the first target key-value pair data obtained by the obtaining module is perturbed, where a value of the first perturbed key-value pair data $\langle K_1^*,V_1^* \rangle$ is randomly set to $\langle a,v_1^* \rangle$ or $\langle b,v \rangle$ based on a preset probability, $v^*_1$ obtained by perturbing $v_1$, all of a, b, and v are preset values, and a and b are different values.

In a possible implementation, the obtaining module is specifically configured to: select a target key from a first key set, where the first key set includes a key in key-value pair data to be collected by the data collector; and when the target key belongs to a second key set, select, as the first target key-value pair data, key-value pair data that includes the target key from key-value pair data recorded by the user equipment, where the second key set includes a key in the key-value pair data recorded by the user equipment.

In a possible implementation, the sending module is further configured to: when the target key does not belong to the second key set, send second perturbed key-value pair data $\langle K_2^*,V_2^* \rangle$ to the data collector, where a value of the second perturbed key-value pair or data $\langle K_2^*,V_2^* \rangle$ is randomly set to $\langle a,v_2^* \rangle$ or $\langle b,v \rangle$ based on the preset probability, and $v_2^*$ is obtained by perturbing a preconfigured target value $v_2$.

In a possible implementation $\langle b,v \rangle$ is $\langle 0, 0 \rangle$, and a is a real number that is not zero.

In a possible implementation, the apparatus further includes a receiving module, configured to receive the target value $v_2$ returned by the data collector, where the target value $v_2$ is a mean of values that are corresponding to the target key and historically collected by the data collector.

In a possible implementation, the obtaining module is specifically configured to select the target key from the first key set through random sampling.

According to a fourth aspect, an apparatus for collecting statistics on user key-value pair data is provided, including: an obtaining module, configured to obtain a perturbed key-value pair data set, where the perturbed key-value pair data set includes a plurality of pieces of perturbed key-value pair data sent by a plurality of user equipments, the plurality of pieces of perturbed key-value pair data are used to collect statistics on frequency of a target key and a mean of values corresponding to the target key, each piece of perturbed key-value pair data includes a first value $K^*$ and a second value $V^*$, a value of each piece of perturbed key-value pair data $\langle K^*,V^* \rangle$ is randomly set to $\langle a,v_1^* \rangle$ or $\langle b,v \rangle$ based on a preset probability, $v^*_1$ is obtained by perturbing a value $v_1$ recorded by the user equipment, all of a, b, and v are preset values, and a and b are different values; and a processing module, configured to collect statistics on frequency of the target key in the key-value pair data set based on first values in the perturbed key-value pair data set obtained by the obtaining module; where the processing module is further configured to collect statistics on a mean of values corresponding to the target key in the key-value pair data set based on second values in the perturbed key-value pair data set obtained by the obtaining module.

In a possible implementation, the frequency of the target key is a ratio of a quantity of third perturbed key-value pair data to a quantity of the plurality of user equipments, and the third perturbed key-value pair data is perturbed key-value pair data whose first value $K^*$ is a in the perturbed key-value pair data set; and the mean of the values corresponding to the target key is a ratio of a sum of second values in the third perturbed key-value pair data to the quantity of the third perturbed key-value pair data.

In a possible implementation, the quantity of the third perturbed key-value pair data is N, and the processing module is configured to: calibrate the third quantity $n_1^*$ and the fourth quantity $n_2^*$ if the third quantity $n_1^*>N$ or the fourth quantity $n_1^*<0$, so that a sum of the third quantity $n_1^*$ and the fourth quantity $n_2^*$ is the quantity of the third perturbed key-value pair data.

In a possible implementation, the apparatus further includes a sending module, configured to send the mean of the target key to the plurality of user equipments.

According to a fifth aspect, user equipment is provided, including an input/output interface, a processor, and a memory. The processor is configured to control the input/output interface to send and receive information, and the memory is configured to store a computer program. The processor is configured to invoke the computer program from the memory and run the computer program, to enable the user equipment to perform the method in the first aspect.

According to a sixth aspect, a data collector is provided, including an input/output interface, a processor, and a memory. The processor is configured to control the input/output interface to send and receive a signal, and the memory is configured to store a computer program. The processor is configured to invoke the computer program from the memory and run the computer program, to enable the data collector to perform the method in the second aspect.

According to a seventh aspect, a computer program product is provided, and the computer program product includes computer program code. When the computer program code runs on a computer, the computer performs the methods in the foregoing aspects.

It should be noted that all or a part of the foregoing computer program code may be stored on a first storage medium. The first storage medium may be encapsulated together with a processor, or may be encapsulated separately from a processor. This is not specifically limited in the embodiments of this application.

According to an eighth aspect, a computer readable medium is provided, and the computer readable medium stores program code. When the computer program code runs on a computer, the computer performs the methods in the foregoing aspects.

DESCRIPTION OF EMBODIMENTS

Figure 1:
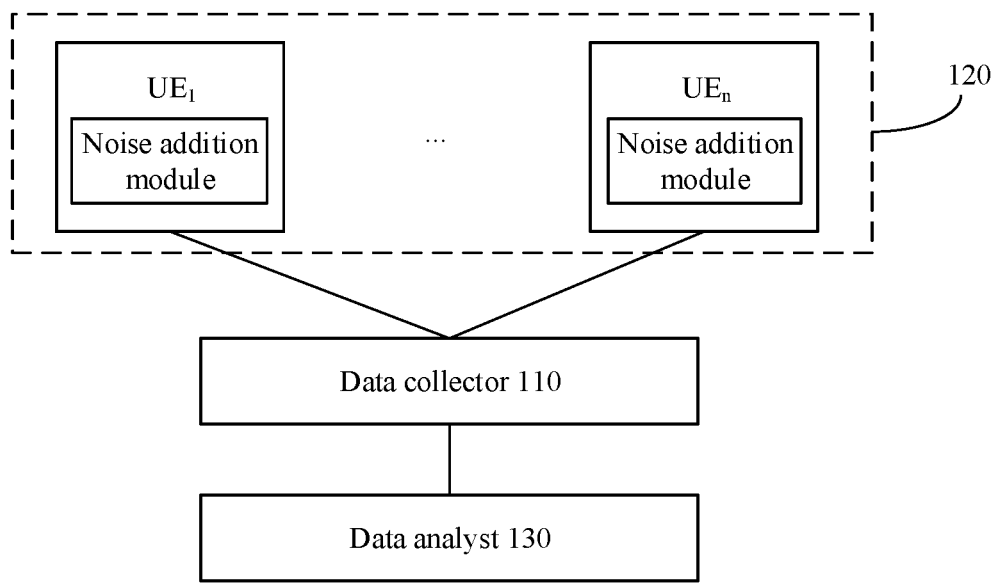
FIG. 1 is a schematic diagram of an applicable scenario of an embodiment of this application.

The following describes technical solutions of this application with reference to accompanying drawings.

For ease of understanding, nouns related to this application are first briefly described.

1. Differential Privacy and Local Differential Privacy

Differential privacy is intended to maximize accuracy of a statistical result when the statistical result is queried from a data collector while minimizing a possibility of learning users who provide data used to generate the statistical result.

A conventional differential privacy technology is usually a centralized differential privacy technology, that is, user equipment centralizes original data at a data center (also referred to as a data collector), and then the data collector perturbs the collected original data and finally publishes a statistical result that meets differential privacy. Therefore, the centralized differential privacy technology protects sensitive information (that is, original data) always based on an assumption: a trusted data collector, that is, it is ensured that the data collector will not steal or leak sensitive information of a user. However, in an actual application, even if the data collector declares that the data collector will not steal or leak the sensitive information of the user, privacy of the user still cannot be ensured. For example, a malicious attacker may obtain user data of a user by using two statistical results of user data that differs only in the user. Therefore, low reliability of the data collector greatly limits application of the centralized differential privacy technology.

In view of this, the LDP technology emerges accordingly. By inheriting a quantitative definition of privacy attacks in the centralized differential privacy technology, the LDP technology refines protection for personal sensitive information. Specifically, in the LDP technology, a data privacy processing process (for example, a process of perturbing user data) is transferred to each user equipment, so that the user equipment can independently process and protect sensitive information of a user, that is, perform more thorough privacy protection.

The LDP technology not only inherits the centralized differential privacy technology, but also extends a new feature, so that the LDP technology has two features: (1) fully considering background knowledge of any attacker, and quantifying a privacy protection degree; (2) localizing perturbed data to defend against a privacy attack from an untrusted data collector. Currently, the local differential privacy technology has become a robust privacy protection model following the centralized differential privacy technology. First, a user performs perturbation on original data, which meets the local differential privacy, and then transmits the data to a data collector. After receiving the perturbed data, the data collector performs a series of query and refinement processing, so that a statistical result generated based on the perturbed data is similar to a statistical result generated based on the original data, that is, an effective statistical result.

A definition of the local differential privacy is as follows: Assuming that a privacy budget $\varepsilon$ is a positive real number, a smaller $\varepsilon$ indicates better privacy performance, and A indicates a randomized algorithm for perturbing data, uses any record as an input (representing data owned by a relying party), and outputs a perturbation result. If the algorithm A obtains a same output result $t^*$ ($t^* \subseteq Ran(A)$) on any two records $t$ and $t'$ ($t, t' \in Dom(A)$), and the result meets the following inequation, A meets $\varepsilon$-local differential privacy:

$$Pr[A(t) \in t^*] \leq e^\varepsilon \times Pr[A(t') \in t^*]$$

Dom (A) represents a domain of definition of the randomized algorithm A, and Ran(A) represents a range of the randomized algorithm A.

2. Key-Value Pair Data and Perturbed Key-Value Pair Data

The key-value pair data may be understood as a data structure. Generally, each piece of key-value pair data may be represented by one key-value pair, and each key-value pair consists of a key and a value. The key-value pair is a storage unit in a KV storage technology. The key may be, for example, a label of a key-value pair, and is used to retrieve the key-value pair or retrieve a value. The value may be valid data that needs to be stored. The key may be generated from the value, for example, a hash operation is performed on the value, and an operation result is used as the value in the key-value pair. The following uses diagnostic data as an example to describe the key-value pair data. For example, the diagnostic data includes key-value pair data such as <influenza, 0.1> and <lung cancer, 0.8>, where the influenza and the lung cancer are keys in the diagnostic data, and incidence rates 0.1 and 0.8 are values in the key-value pair data. That is, the value is 0.1 in the key-value pair data whose key is the influenza, and the value is 0.8 in the key-value pair data whose key is the lung cancer.

User key-value pair data may be understood as key-value pair data really recorded by a user, and includes the following first target key-value pair data and second target key-value pair data.

The perturbed key-value pair data may be understood as perturbed key-value pair data obtained by perturbing the key-value pair data. The perturbed key-value pair data includes a first value and a second value, where the first value may be understood as being obtained by perturbing the key in the key-value pair data, and a data collector may determine frequency of the key based on the first value. The second value may be understood as being obtained by perturbing the value in the key-value pair data, and the data collector may determine a mean of values corresponding to the key based on the second value. The perturbed key-value pair data includes the following first perturbed key-value pair data and second perturbed key-value pair data.

3. A statistical result: is a statistical result generated by a data collector by collecting statistics based on data reported by a plurality of user equipments. Generally, the statistical result may include two parameters: frequency and a mean.

The frequency represents occurrence frequency of a key in key-value pairs collected by the data collector from the plurality of user equipments. It is assumed that a quantity of the plurality of user equipments is equal to a quantity of users and is Y, and a quantity of occurrence times of a jth key in key-value pair data reported by the Y user equipments is $N_j$, frequency of the jth key is $$f_j = \frac{N_j}{Y},$$

where Y and j are positive integers.

It should be noted that the statistical result may include frequency corresponding to a plurality of different keys. It is assumed that the statistical result is a statistical result for k keys, the k keys in the statistical result may be represented by using a vector $K=[k_1, L\, L, k_k]$, and frequency corresponding to the k keys may be represented by using $f=[f_1, L\, L, f_k]$, where each component in the vector f represents frequency corresponding to each key in the vector K, that is, an ith component $f_i$ in the vector f represents frequency of an ith component (that is, an ith key) $k_i$ in the vector K, where $i \in [1,k]$, i and k are positive integers.

The mean represents a mean of values corresponding to a key in the key-value pairs collected by the data collector from the plurality of user equipments. It is assumed that in the key-value pair data reported by the Y users, a sum of values corresponding to a jth key $k_j$ is m, and a mean of the values corresponding to $k_j$ is $$m_j = \frac{m}{N_j}.$$

Correspondingly, the statistical result may include a mean of values corresponding to a plurality of different keys. The mean of the values corresponding to the plurality of keys may also be represented by using a vector $M=[m_1, L\, L, m_k]$. Each component in the vector M represents a mean of values corresponding to each key in the vector K, that is, an ith component $m_i$ in the vector M represents a mean of values corresponding to an ith component (that is, an ith key) $k_i$ in the vector K.

With reference to FIG. 1, the following describes a schematic diagram of an applicable scenario of an embodiment of this application based on the foregoing noun explanations. An architecture shown in FIG. 1 includes a data collector 110, at least one user equipment 120, and a data analyst (data analysts) 130.

The at least one user equipment 120 is generally an individual user having original data, and is also referred to as a data source (refer to UE1 to UEn in the figure). In LDP, each user equipment may perturb the original data by using a differential privacy perturbation module, so as to generate perturbed data.

The user equipment may include but is not limited to a mobile terminal, a mobile telephone, a handset, a portable equipment, and the like.

The data collector 110 is configured to: receive data sent by the at least one user equipment 120, and collect statistics and generate a statistical result based on the received data. In the LDP, after receiving perturbed data D' sent by the at least one user equipment, a data collection apparatus generates a statistical result based on the perturbed data D' by using a specific algorithm. The specific algorithm enables the statistical result generated based on the perturbed data D' to be similar to a statistical result generated based on the original data.

Generally, the data collector may include at least one server, or may be servers of some large organizations or companies.

The data analyst 130 is an individual or an organization that needs to obtain the statistical result from the data collector, or is an individual or an organization interested in the statistical result.

Currently, research on the local differential privacy technology is generally based on a simple data type, such as discrete data, set-valued data, and numerical data, but there is no data protection method for key-value pair data. However, as the key-value pair data is widely used, much sensitive data exists in a form of key-value pair data. Therefore, it is necessary to protect the key-value pair data.

In consideration that the key-value pair data is also essentially a combination of discrete data (key) and numerical data (value), it is intuitively assumed that the key in the key-value pair data may be perturbed by using a perturbation method for discrete data in the prior art, and the value in the key-value pair data is perturbed by using a perturbation method for numerical data in the prior art. However, in this manner of separately perturbing the key and the value, an association between the key and the value is not considered, thereby reducing validity of a statistical result, that is, a statistical result generated based on the perturbed data is relatively different from a statistical result generated based on original data. For example, it is assumed that key-value type diagnostic data is <influenza, 0.1>, and the influenza is a key in the key-value pair data, and 0.1 is a value in the two pieces of key-value pair data. If the influenza is perturbed as a lung cancer, the value 0.1 corresponding to the influenza also needs to be perturbed within a range in which a value corresponding to the lung cancer is located, so as to ensure the association between the key and the value. However, perturbation processes of the key and the value are separately performed. In the perturbation process of the value, a result obtained after the key is perturbed cannot be obtained, and therefore, the association between the key and the value cannot be ensured in the perturbed key-value pair data.

Figure 2:
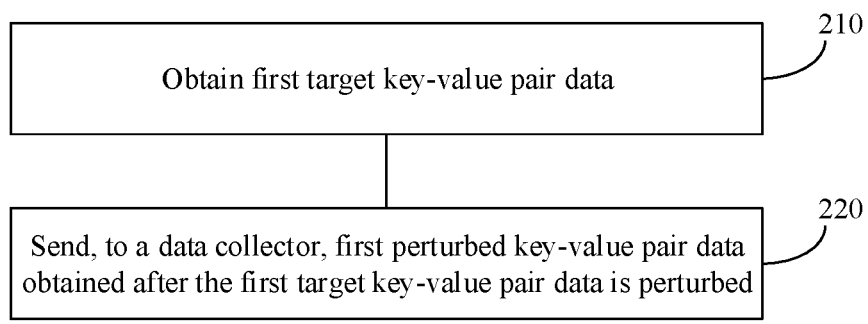
FIG. 2 is a schematic flowchart of a method for collecting key-value pair data according to an embodiment of this application.
Figure 3:
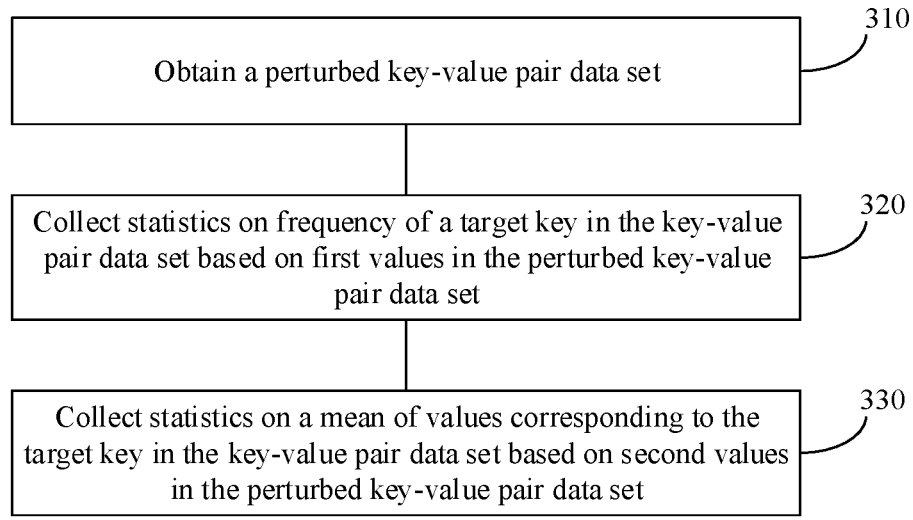
FIG. 3 is a flowchart of a method for collecting key-value pair data according to an embodiment of this application.

To ensure the association between the key and the value in the perturbed key-value pair data, this application provides a manner of perturbing the key-value pair data, and further provides a method for collecting statistics based on the perturbed key-value type data by the data collector, which helps ensure the association between the key and the value in the key-value pair data. With reference to FIG. 2, the following describes a manner of collecting key-value pair data (that is, a perturbation manner) in an embodiment of this application. With reference to FIG. 3, the following describes a manner of collecting key-value pair data (that is, a statistical manner) in another embodiment of this application.

It should be noted that in a method shown in FIG. 2, for example, only one user equipment reports one piece of key-value pair data to a data collector. If the user equipment needs to report a plurality of pieces of key-value pair data to the data collector, a perturbation process of each piece of key-value pair data may be the same as a perturbation process shown in FIG. 2. If a plurality of user equipments report key-value pair data to the data collector, a perturbation manner used by each user equipment may also be the same as the perturbation manner shown in FIG. 2. Correspondingly, in a method shown in FIG. 3, a statistical result generated by a data collector may be obtained through statistics collection based on key-value pair data reported by a plurality of user equipments.

FIG. 2 is a schematic flowchart of a method for collecting key-value pair data according to an embodiment of this application. The method shown in FIG. 2 includes step 210 and step 220. It should be understood that the method shown in FIG. 2 may be performed by a device that may be used as a data source, for example, the user equipment in FIG. 1.

210. Obtain first target key-value pair data $\langle k_1, v_1 \rangle$, where $k_1$ is a value of a key in the target key-value pair data, and $v_1$ is a value of a value in the first target key-value pair data.

The first target key-value pair data may be original data of a user that is recorded by the user equipment.

220. Send, to a data collector, first perturbed key-value pair data $\langle K_1^*, V_1^* \rangle$ obtained after the first target key-value pair data is perturbed, where a value of the first perturbed key-value pair data $\langle K_1^*, V_1^* \rangle$ is randomly set to $\langle a, v_1^* \rangle$ or $\langle b, v \rangle$ based on a preset probability, $v_1^*$ is obtained by perturbing $v_1$, all of a, b, and v are preset values, and a and b are different values.

When the value of the first perturbed key-value pair data $\langle K_1^*, V_1^* \rangle$ is $\langle a, v_1^* \rangle$, that is, a first value $K_1^*$ of the first perturbed key-value pair data is a, it indicates that the first perturbed key-value pair data is valid data, and the first value $K_1^*$ and a second value $V_1^*$ in the first perturbed key-value pair data are included into a statistical result generated by the data collector.

When the value of the first perturbed key-value pair data $\langle K_1^*, V_1^* \rangle$ is $\langle b, v \rangle$, that is, the first value $K_1^*$ of the first perturbed key-value pair data is b, it indicates that the first perturbed key-value pair data is invalid data, or in this case, it may be considered that the first perturbed key-value pair data is null, that is, user equipment does not record the key-value pair data. The first value $K_1^*$ and the second value $V_1^*$ in the first perturbed key-value pair data are not included into the statistical result generated by the data collector. For example, $\langle b, v \rangle$ may be $\langle 0, 0 \rangle$.

It should be noted that when the value of the first value $K_1^*$ in the first perturbed key-value pair data is b, the data collector directly determines that the first perturbed key-value pair data is null, and a mean in the statistical result will not be affected regardless of the value of the second value in the first perturbed key-value pair data. Therefore, v may be any value.

However, to improve privacy of the first perturbed key-value pair data, v cannot be relatively different from a value of a value in key-value pair data really recorded by the user equipment, so as to prevent a data attacker from identifying that the first perturbed key-value pair data is not real data.

In this embodiment of this application, the first target key-value pair data is perturbed as the first perturbed key-value pair data, and the value of the first perturbed key-value pair data is randomly set to $\langle a, v_1^* \rangle$ or $\langle b, v \rangle$ based on the preset probability, so that the data collector can determine, based on the value a or b of the first value in the first perturbed key-value pair data, whether to include the entire first perturbed key-value pair data into the statistical result in a process of generating the statistical result. In this way, an association between the value and the key in the key-value pair data is reserved in the first perturbed key-value pair data, which improves availability of the first perturbed key-value pair data. That is, the statistical result generated by the data collector based on the first perturbed key-value pair data is closer to a statistical result generated based on original user key-value pair data.

Optionally, randomly setting the value of the first perturbed key-value pair data $\langle k_1^*, V_1^* \rangle$ $\langle a, v_1^* \rangle$ or $\langle b, v \rangle$ based on the preset probability includes: perturbing the first target key-value pair $\langle k_1, v_1 \rangle$ based on a privacy budget $\varepsilon_1$ and by using a first differential privacy model, to obtain the first perturbed key-value pair data $\langle K_1^*, V_1^* \rangle$, where the first differential privacy model is $$\langle K_1^*, V_1^* \rangle = \begin{cases} \langle a, v_1^* \rangle \ w.p. \ \frac{e^{\varepsilon_1}}{1+e^{\varepsilon_1}}, \\ \langle b, v \rangle \ w.p. \ \frac{1}{1+e^{\varepsilon_1}} \end{cases},$$

a is a rational number that is not 0, and e is a natural logarithm constant.

The first differential privacy model $$\langle K_1^*, V_1^* \rangle = \begin{cases} \langle a, v_1^* \rangle \ w.p. \ \frac{e^{\varepsilon_1}}{1+e^{\varepsilon_1}} \\ \langle b, v \rangle \ w.p. \ \frac{1}{1+e^{\varepsilon_1}} \end{cases}$$

may be understood as with probability (with probability, w.p.) of $$\frac{e^{\varepsilon_1}}{1+e^{\varepsilon_1}},$$

and the value of the first perturbed key-value pair data $\langle K_1^*, V_1^* \rangle$ may be set to $\langle a, v_1^* \rangle$.

Correspondingly, for with probability of $$\frac{1}{1+e^{\varepsilon_1}},$$

the value of the first perturbed key-value pair data $\langle K_1^*, V_1^* \rangle$ may be set to $\langle 0, 0 \rangle$.

$v_1^*$ is obtained b perturbing $v_1$. This may be understood as a process of independently perturbing a value of key-value pair data. This process may be performed before the first target key-value pair data is perturbed as the first perturbed key-value pair data based on the preset probability, or may be performed after the first target key-value pair data is perturbed as the first perturbed key-value pair data based on the preset probability. This is not limited in this embodiment of this application.

The foregoing may use a perturbation manner (for example, a Harmony algorithm) of numerical data to perturb a value in the second key-value pair. The perturbation manner may alternatively be another perturbation manner of numerical data. This is not limited in this embodiment of this application.

Certainly, the data collector needs to determine frequency and a mean in the statistical result based on first values and second values in perturbed key-value pair data reported by a plurality of user equipments. When a=1, a process of counting a quantity of occurrence times of a key by the data collector may be simplified. Based on the key-value pair data reported by the plurality of user equipments, the quantity of occurrence times of the key may be directly obtained by adding up keys in third key-value pair data, and further frequency of the key and a mean of values corresponding to the key in the statistical result may be calculated. If a≠1, after the keys in the third key-value pair data are added up based on the perturbed key-value pair data reported by the plurality of user equipments, the quantity of occurrence times of the key can be obtained only when a result after the adding up is a.

To further improve data privacy, the user equipment may randomly select (or randomly sample) one key from a to-be-collected first key set as an "original key" (that is, a target key) for generating perturbed key-value pair data. In this way, the target key may be a key in key-value pair data really collected by the user equipment, or the target key may not be the key in the key-value pair data really collected by the user equipment. This helps improve privacy of the key-value pair data.

If the target key has a corresponding value in the original key-value pair data collected by the user equipment, that is, the target key belongs to a second key set, where the second key set includes keys in all key-value pair data collected by the user equipment, key-value pair data that includes the target key and that is in the key-value pair data recorded by the user equipment is used as the first target key-value pair data for perturbation, to finally generate the first perturbed key-value pair data.

In this embodiment of this application, selecting the target key from the first key set helps avoid allocating the privacy budget $\varepsilon_1$ to each key in the first key set, so that the privacy budget $\varepsilon_1$ is only used in the perturbation process of the target key-value pair data. Correspondingly, when collecting statistics on the statistical result, the data collector may also use the privacy budget $\varepsilon_1$ only to calibrate the statistical result for the target key-value pair data, thereby helping improve accuracy of the statistical result.

If the target key does not belong to the second key set, that is, a same key as the target key cannot be found in the key-value pair data recorded by the user equipment, second perturbed key-value pair data $\langle K_2^*, V_2^* \rangle$ is sent to the data collector, where a value of the second perturbed key-value pair data $\langle K_2^*, V_2^* \rangle$ is randomly set to $\langle a, v_2^* \rangle$ or $\langle b, v \rangle$ based on the preset probability, and $v_2^*$ is obtained by perturbing a preconfigured target value $v_2$.

If the same key as the target key cannot be found in the key-value pair data recorded by the user equipment, in this case, to ensure an association between the key and the value, a value (that is, the target value) needs to be configured for the target key, so as to generate the second perturbed key-value pair data.

$v_2^*$ is obtained by perturbing the preconfigured target value $v_2$. For a specific perturbation manner, refer to the manner of perturbing the value in the perturbed key-value pair data described in step 210.

The target value may be randomly selected by referring to a value range of the value in original key-value pair data recorded in the user equipment. Generally, to improve accuracy of generating the statistical result by the data collector, the data collector needs to send the statistical result to the user equipment, and the user equipment may use a mean returned by the data collector as the target value.

In addition, the target value may be selected from the first key set, and the first key set may include one or more different keys. When the first key set includes a plurality of different keys, the data collector cannot identify, from the first perturbed key-value pair data and the second perturbed key-value pair data, a statistical result of which key the perturbed key-value pair data is used to generate. Therefore, the user equipment may further send an identifier to the data collector, where the identifier is used to indicate that the perturbed key-value pair data sent by the user equipment is used to generate a statistical result corresponding to which key.

In this embodiment of this application, the user equipment selects the target key from the first key set as a "key of the original key-value pair data" for generating the first perturbed key-value pair data, that is, the first perturbed key-value pair data sent by the user equipment to the data collector may not be user key-value pair data really recorded by the user equipment to some extent, thereby helping improve privacy of the first perturbed key-value pair data.

Optionally, randomly setting the value of the second perturbed key-value pair data $\langle K_2^*, V_2^* \rangle$ to $\langle a, v_2^* \rangle$ or $\langle b, v \rangle$ based on the preset probability includes: perturbing second target key-value pair data based on the privacy budget $\varepsilon_1$ and by using a second differential privacy model, to obtain the second perturbed key-value pair data $\langle K_2^*, V_2^* \rangle$, where the second differential privacy model is $$\langle K_2^*, V_2^* \rangle = \begin{cases} \langle b, v \rangle & w.p. \ \frac{e^{\varepsilon_1}}{1+e^{\varepsilon_1}} \\ \langle a, v_2^* \rangle & w.p. \ \frac{1}{1+e^{\varepsilon_1}} \end{cases},$$

a key in the second target key-value pair data is the target key, and a value in the second target key-value pair data is $v_2^*$.

The second differential privacy model $$\langle K_2^*, V_2^* \rangle = \begin{cases} \langle b, v \rangle & w.p. \ \frac{e^{\varepsilon_1}}{1+e^{\varepsilon_1}} \\ \langle a, v_2^* \rangle & w.p. \ \frac{1}{1+e^{\varepsilon_1}} \end{cases}$$

may be understood as with probability of $$\frac{e^{\varepsilon_1}}{1+e^{\varepsilon_1}},$$

and the second perturbed key-value pair data $\langle K_2^*, V_2^* \rangle$ may be perturbed as $\langle b, v \rangle$. Correspondingly, for with probability of $$\frac{1}{1+e^{\varepsilon_1}},$$

the second perturbed key-value pair data $\langle K_2^*, V_2^* \rangle$ may be perturbed as $\langle a, v_2^* \rangle$.

In the first differential privacy model and the second differential privacy model described above, it can be learned that the probability value $$\frac{e^{\varepsilon_1}}{1+e^{\varepsilon_1}} \ f \ \frac{1}{1+e^{\varepsilon_1}}.$$

That is, for the target key belonging to the second key set, a probability that the first target key-value pair data including the target key is perturbed as $\langle a,v^*_1\rangle$ is higher than a probability that the first target key-value pair data including the target key is perturbed as $\langle b,v\rangle$, or a probability that the value of the first perturbed key-value pair data is $\langle a,v^*_1\rangle$ is higher than a probability that the value of the first perturbed key-value pair data is $\langle b,v\rangle$. For the target key that does not belong to the second key set, a probability that the value of the second perturbed key-value pair data is $\langle b,v\rangle$ is higher than a probability that the second perturbed key-value pair data is perturbed as $\langle a,v^*_2\rangle$. In this way, the statistical result collected by the data collector is closer to the statistical result obtained based on the original key-value pair data.

To ensure privacy of the key-value pair data, the key in the key-value pair data may be first perturbed, and a conventional method for perturbing numerical data may be usually used, for example, the foregoing Harmony algorithm. In a process of perturbing the value in the key-value pair data by using the Harmony algorithm, the user equipment usually needs three steps: discretization, perturbation, and calibration. However, in this embodiment of this application, the process of perturbing the value in the key-value pair by using the Harmony algorithm, the third step of calibration in the Harmony algorithm is performed by the data collector instead of the user equipment. This helps reduce computation overheads caused by the user equipment to calibrate data. In addition, the data collector may directly calibrate a perturbation abnormality value in a process of collecting statistics on the statistical result. This helps improve calibration efficiency and avoids the following case: in a conventional calibration process, each user equipment can calibrate only key-value pair data of the user equipment itself, and in the process of generating the statistical result by the data collector, if an abnormality occurs in the statistical result, secondary calibration needs to be performed. It should be noted that a process of calibrating the data by the data collector is described in detail in the following description of a process of generating the statistical result by the data collector. For brevity, details are not described herein.

In this embodiment of this application, the process of perturbing the value in the key-value pair data by the user equipment by using the Harmony algorithm may include only steps of discretization and perturbation. That is, the step of discretization includes: obtaining the value v in the first target key-value pair data, and discretizing the value v in the first target key-value pair data based on a first discretization model $$v_1 = \begin{cases} 1 & w.p.\ \dfrac{1+v}{2} \\ -1 & w.p.\ \dfrac{1-v}{2} \end{cases},$$

to obtain a discrete value $v_1$. The step of perturbation includes: perturbing the discrete value $v_1$ based on a privacy budget $\varepsilon_2$ and by using a third differential privacy model $$v_1^* = \begin{cases} v^* & w.p.\ \dfrac{e^{\varepsilon_2}}{1+e^{\varepsilon_2}} \\ -v^* & w.p.\ \dfrac{1}{1+e^{\varepsilon_2}} \end{cases},$$

to obtain $v^*_1$.

Correspondingly, a process of perturbing the target value $v_2$ to obtain $v_2^*$ may also include only the steps of discretization and perturbation. For brevity, details are not described herein.

It can be learned from the foregoing described step of discretization that, regardless of the key in the key-value pair data, the value in the key-value pair data is first discretized into two values: −1 and 1. That is, in a set of the key-value pair data sent by the plurality of user equipments to the data collector, regardless of the value of the key in the key-value pair data, the value corresponding to the key is −1 or 1. This helps improve privacy of the key-value pair data. For the key-value pair data, value ranges of values that may be corresponding to different keys are different. If the key and the value are separately perturbed, the value range of the value may not correspond to that of the key. In this case, an attacker can easily crack the process of perturbing the key-value pair data to obtain the real key-value pair data. For example, original key-value pair data that needs to be reported by the plurality of user equipments is <influenza, 0.1> and <lung cancer, 0.8>, a value range of a value corresponding to the influenza is usually [0, 0.5], and a value range of a value corresponding to the lung cancer is [0.6, 0.9]. In the process of perturbing the key-value pair data, it is likely that after the key is perturbed from the influenza to the lung cancer, the value corresponding to the influenza still belongs to [0, 0.5] after being perturbed, but does not belong to the value range [0.6, 0.9] of the value corresponding to the lung cancer. In this case, an attacker may obtain a real value according to an information difference of a value range.

With reference to Table 1, the following describes a perturbation program for perturbing the key-value pair data by the user equipment in this embodiment of this application.

TABLE 1

| Algorithm 2 Local Perturbation Protocol (LPP) | |
|---|---|
| Input: | User $u_i$'s set of KV pairs $S_i$ |
|  | The set of keys $\mathcal{K}$ |
|  | Privacy budgets $\varepsilon_1$ and $\varepsilon_2$ |
| Output: | LPP($S_i$, $\mathcal{K}$, $\varepsilon_1$, $\varepsilon_2$) is the perturbed KV pair |
|  | $\langle k_j, v^*\rangle$ of the j-th key |
| Procedure: | |
| 1: | d = \|$\mathcal{K}$\| |
| 2: | Sample j uniformly at random from [d] |
| 3: | if $k_j$ exists in the key set of $S_i$ then |
| 4: | $v^*$ = VPP($v_j$, $\varepsilon_2$) |
| 5: | Perturbs $\langle k_j, v^*\rangle$ as: |
|  | $\langle k_j, v^*\rangle = \begin{cases} \langle 1, v^*\rangle & w.p.\ \dfrac{e^{\varepsilon_1}}{1+e^{\varepsilon_1}} \\ \langle 0, 0\rangle & w.p.\ \dfrac{1}{1+e^{\varepsilon_1}} \end{cases}$ |
| 6: | else |
| 7: | Randomly draw a value $\tilde{m} \in [-1, 1]$ |
| 8: | $v^*$ = VPP($\tilde{m}$, $\varepsilon_2$) |
| 9: | Perturbs $\langle k_j, v^*\rangle$ as: |
|  | $\langle k_j, v^*\rangle = \begin{cases} \langle 0, 0\rangle & w.p.\ \dfrac{e^{\varepsilon_1}}{1+e^{\varepsilon_1}} \\ \langle 1, v^*\rangle & w.p.\ \dfrac{1}{1+e^{\varepsilon_1}} \end{cases}$ |
| 10: | return j and $\langle k_j, v^*\rangle$ |

Table 1 is a procedure in which the perturbation program, also referred to as a Local Perturbation Protocol (LPP), is used to perturb the key-value pair data in this embodiment of this application. When key-value type data is perturbed based on the perturbation manner in this embodiment of this application, parameters that need to be input include: a set $S_i$ of all key-value pair data sampled by the user equipment, a set K of keys in all key-value pair data that needs to be collected by the data collector, a privacy budget $\varepsilon_1$ used for perturbing the key in the key-value pair data, and a privacy budget $\varepsilon_2$ used for perturbing the value in the key-value pair data. A result finally output by the perturbation program includes perturbed key-value pair data $\langle k_j, v^* \rangle$ and j, where j represents an element identifier of a key $k_j$ in the set K of keys.

A specific perturbation process includes step 1 to step 10.

Step 1: Assign a set of keys to d.

Step 2: Select a jth key $k_j$ from d by using a random sampling process.

Step 3: If $k_j$ belongs to the set $S_i$ of key-value pair data, perform steps 4, 5, and 10; and if $k_j$ does not belong to the set $S_i$ of key-value pair data (refer to step 6), perform step 7 to step 10.

Step 4: Invoke a value perturbation primitive (Value Perturbation Primitive, VPP) to perturb $v_j$, and assign a perturbed value to a variable $v^*$. A privacy budget used in the perturbation process is $\varepsilon_2$, and $v_j$ represents a value of a jth piece of key-value pair data in the set $S_i$ of key-value pair data, that is, the value corresponding to the key $k_j$ in the set $S_i$ of key-value pair data.

Step 5: Perturb $\langle k_j, v^* \rangle$ by using a first differential privacy model, and assign perturbed key-value pair data to a variable $\langle k_j, v^* \rangle$, where the first differential privacy model pair $$\langle k_j, v^* \rangle = \begin{cases} \langle 1, v_1^* \rangle & w.p.\ \dfrac{e^{\varepsilon_1}}{1+e^{\varepsilon_1}} \\ \langle 0, 0 \rangle & w.p.\ \dfrac{1}{1+e^{\varepsilon_1}} \end{cases}$$

indicates that a probability of perturbing the original value $\langle k_j, v^* \rangle$ as $\langle 1, v^*_1 \rangle$ is $$\frac{e^{\varepsilon_1}}{1+e^{\varepsilon_1}},$$

and a probability of perturbing the original value $\langle k_j, v^* \rangle$ as $\langle 0, 0 \rangle$ is $$\frac{1}{1+e^{\varepsilon_1}}.$$

Step 7: If does not belong to the set $S_i$ of key-value pair data, randomly select one value from [−1, 1] as the value corresponding to the key $k_j$ and assign the value to a variable $\dot{m}$.

Step 8: Invoke the VPP algorithm to perturb $\dot{m}$, and assign a perturbed value to the variable $v^*$. A privacy budget used in the perturbation process is $\varepsilon_2$, and $v_j$ represents a value of a jth piece of key-value pair data in the set $S_i$ of key-value pair data, that is, the value corresponding to the key $k_j$ in the set $S_i$ of key-value pair data.

Step 9: Perturb $\langle k_j, v^* \rangle$ by using a second differential privacy model, and assign perturbed key-value pair data to the variable $\langle k_j, v^* \rangle$, where the second differential privacy model $$\langle k_j, v^* \rangle = \begin{cases} \langle 1, v_1^* \rangle & w.p.\ \dfrac{1}{1+e^{\varepsilon_1}} \\ \langle 0, 0 \rangle & w.p.\ \dfrac{e^{\varepsilon_1}}{1+e^{\varepsilon_1}} \end{cases}$$

indicates that a probability of perturbing the original value $\langle k_j, v^* \rangle$ as $\langle 1, v^*_1 \rangle$ is $$\frac{e^{\varepsilon_1}}{1+e^{\varepsilon_1}},$$

and a probability of perturbing the original value $\langle k_j, v^* \rangle$ as $\langle 0, 0 \rangle$ is $$\frac{1}{1+e^{\varepsilon_1}}.$$

Step 10: Return the perturbed key-value pair data $\langle k_j, v^* \rangle$ and j.

The VPP algorithm used in step 4 and step 8 may be implemented by using a perturbation algorithm shown in Table 2.

TABLE 2

| Algorithm 1 Value Perturbation Primitive | |
|---|---|
| Input: | Value $v$ of a KV pair<br>Privacy budget $\varepsilon_2$ |
| Output: | VPP($v, \varepsilon_2$) is the perturbed value $v^*$ |
| Procedure: | |
| 1: Discretization: | $v^* = \begin{cases} 1 & w.p.\ \dfrac{1+v}{2} \\ -1 & w.p.\ \dfrac{1-v}{2} \end{cases}$ |
| 2: Perturbation: | $v^* = \begin{cases} v^* & w.p.\ \dfrac{e^{\varepsilon_2}}{1+e^{\varepsilon_2}} \\ -v^* & w.p.\ \dfrac{1}{1+e^{\varepsilon_2}} \end{cases}$ |
| 3: return $v^*$ | |

Table 2 is a method procedure for perturbing the value in the key-value pair data by using the VPP in the embodiment of this application. Parameters that need to be input include a value v of to-be-perturbed key-value pair data and a privacy budget $\varepsilon_2$ used for perturbing v. A result finally output by the perturbation program includes a perturbed value $v^*$.

A specific perturbation process includes step 1 to step 3.
Step 1: Discretize the value v based on a formula $$v^* = \begin{cases} 1 & w.p. \ \frac{1+v}{2} \\ -1 & w.p. \ \frac{1-v}{2} \end{cases},$$

where v* is discretized as 1 based on a probability of $$\frac{1+v}{2},$$

v* is discretized as −1 based on a probability of $$\frac{1-v}{2};$$

and assign a finally discretized value to the variable v*.
Step 2: According to a formula $$v^* = \begin{cases} -v^* & w.p. \ \frac{1}{1+e^{\varepsilon_2}} \\ v^* & w.p. \ \frac{e^{\varepsilon_2}}{1+e^{\varepsilon_2}} \end{cases},$$

perturb v* as −v* based on a probability of $$\frac{1}{1+e^{\varepsilon_2}},$$

and perturb v* as v* based on a probability of $$\frac{e^{\varepsilon_2}}{1+e^{\varepsilon_2}},$$

that is, keep the original value unchanged; and assign a perturbed value to the variable v*.
Step 3: Return the perturbed value v*.

With reference to FIG. 3, the following describes a flowchart of a method for collecting user key-value pair data according to an embodiment of this application. The method shown in FIG. 3 may be performed by the data collector shown in FIG. 1. The method shown in FIG. 3 includes step 310 to step 350.

310. Obtain a perturbed key-value pair data set.

Specifically, the perturbed key-value pair data set includes a plurality of pieces of perturbed key-value pair data sent by a plurality of user equipments, the plurality of pieces of perturbed key-value pair data are used to collect statistics on frequency of a target key and a mean of values corresponding to the target key, each piece of perturbed key-value pair data includes a first value K* and a second value V*, a value of each piece of perturbed key-value pair data $\langle K^*, V^* \rangle$ is randomly set to $\langle a, v_1^* \rangle$ or $\langle b, v \rangle$ based on a preset probability, $v_1^*$ is obtained by perturbing a value $v_1$ recorded by the user equipment, all of a, b, and v are preset values, and a and b are different values.

320. Collect statistics on frequency of the target key in the key-value pair data set based on first values in the perturbed key-value pair data set.

Specifically, for perturbed key-value pair data whose first value is b in the perturbed key-value pair data set, the data collector may determine that the perturbed key-value pair data is null; and for perturbed key-value pair data whose first value is a in the perturbed key-value pair data set, the data collector may determine that the perturbed key-value pair data is not null. In this way, the frequency of the target key is a ratio of a quantity of third perturbed key-value pair data to a quantity of the plurality of user equipments, and the third perturbed key-value pair data is perturbed key-value pair data whose first value K* is a in the perturbed key-value pair data set.

330. Collect statistics on a mean of values corresponding to the target key in the key-value pair data set based on second values in the perturbed key-value pair data set.

Specifically, for perturbed key-value pair data whose first value is b in the perturbed key-value pair data set, the data collector may determine that the perturbed key-value pair data is null; and for perturbed key-value pair data whose first value is a in the perturbed key-value pair data set, the data collector may determine that the perturbed key-value pair data is not null. In this way, the mean of the values corresponding to the target key is a ratio of a sum of second values in the third perturbed key-value pair data to the quantity of the third perturbed key-value pair data.

In this embodiment of this application, the value of each piece of perturbed key-value pair data $\langle K^*, V^* \rangle$ is randomly set to $\langle a, v_1^* \rangle$ or $\langle b, v \rangle$ or based on the preset probability, so that the data collector can determine, based on the value a or b of the first value in the perturbed key-value pair data, whether to include the entire perturbed key-value pair data into the statistical result in a process of generating the statistical result. In this way, an association between the value and the key in the key-value pair data is reserved in the perturbed key-value pair data, which improves availability of the perturbed key-value pair data. That is, the statistical result generated by the data collector based on the perturbed key-value pair data is closer to a statistical result generated based on original user key-value pair data.

It should be noted that the method shown in FIG. 3 describes only a method procedure for collecting statistics on one key (the target key). The data collector may further collect statistics on statistical results of a plurality of different keys, and a process of generating a statistical result of each key is completely the same as the method described in FIG. 3. For example, the first key set may be represented by using a vector K=[$k_1$,L L,$k_k$], and frequency of a key in the first key set may be represented by using a vector f=[$f_1$,L L,$f_k$]. There is a correspondence between components having a same subscript in the vector f and the vector K, $f_1$ indicates frequency of a key whose subscript is 1 in the vector K, that is, $f_1$ indicates frequency of a key $k_1$.

In this embodiment of this application, a key and a value in target key-value pair data are simultaneously perturbed by using the first differential privacy model. If the key in the target key-value pair data is perturbed as 0, the value in the target key-value pair data is also correspondingly perturbed as 0. If the key in the target key-value pair data is perturbed as a, the value in the target key-value pair data is also correspondingly perturbed as $v^*_1$. That is, if the key in the target key-value pair data exists (that is, not 0), the value in the target key-value pair data also exists. If the key in the target key-value pair data does not exist (that is, 0), the value in the target key-value pair data does not exist either. This avoids a prior-art case that the key and the value in the key-value pair data are separately perturbed, and when the key in the key-value pair data is 0, the value in the key-value pair data is not 0; alternatively, when the key in the key-value pair data is not 0, the value in the key-value pair data is 0, thereby helping improve the association between the key and the value in the key-value pair data.

Optionally, $\langle a, v_1^* \rangle$ is $\langle 1, v_1^* \rangle$ and $\langle b, v \rangle$ is $\langle 0, 0 \rangle$. In this way, in a process of collecting statistics on the quantity of the third perturbed key-value pair data, the data collector may directly accumulate and add up the first values in the perturbed key-value pair data set, that is, the quantity of the third perturbed key-value pair data. In a process of collecting statistics on the sum of the second values in the third perturbed key-value pair data, all the second values in the perturbed key-value pair data set may be directly added up, that is, the sum of the second values in the third perturbed key-value pair data, so as to simplify the process of generating the statistical result by the data collector.

Optionally, the method further includes: calibrating the frequency f of the target key based on a frequency calibration model to obtain calibrated frequency f* of the target key, where the frequency calibration model is $$f^* = \frac{p-1+f}{2p-1}, \text{ where } p = \frac{e^{\varepsilon_1}}{e^{\varepsilon_1}+1},$$

and $\varepsilon_1$ represents a privacy budget used for generating the perturbed key-value pair data based on a differential privacy model.

In the process of perturbing the key-value pair data shown in FIG. 2, for the user key-value pair data recorded by the user equipment, there is a probability that the key in the original key-value pair data is perturbed as 0. In addition, there is also a probability that a key in key-value pair data not recorded by the user equipment but existing in the first key set is perturbed from 0 to 1. Because of this key perturbation manner, an error exists when the data collection apparatus collects statistics on the occurrence frequency of the key, and the frequency may be calibrated by using the foregoing frequency calibration model.

In the perturbation process shown in FIG. 2, not only the key in the key-value pair data set is perturbed, but also the value in the key-value pair data set is perturbed. Therefore, it is possible that a quantity of key-value pair data whose values are $v^*_1$ in the key-value pair data set is greater than a total quantity of key-value pair data in the key-value pair data set. Alternatively, a quantity of key-value pair data whose values are $v^*_2$ in the key-value pair data set is greater than a total quantity of key-value pair data in the key-value pair data set. Alternatively, a quantity of key-value pair data whose values are $v^*_1$ in the key-value pair data set is less than 0. Alternatively, a quantity of key-value pair data whose values are $v^*_2$ in the key-value pair data set is less than 0. In any of the foregoing cases, it indicates that the key in the key-value pair data in the key-value pair data set needs to be calibrated, so that a sum of the quantity of key-value pair data whose values are $v^*_1$ in the key-value pair data set and the quantity of key-value pair data whose values are $v^*_2$ in the key-value pair data set is equal to the total quantity of key-value pair data in the key-value pair data set.

That is, to improve accuracy of the statistical result generated by the data collector, it can be learned from the foregoing process of perturbing the value in the key-value pair data that regardless of $v^*_1$ or $v^*_2$, $-v$ or $v$ is finally presented. That is, the second value in the third perturbed key-value pair data is $-v$ or $v$. The method further includes the following:

The second value $v^*_1$ of the third perturbed key-value pair data is obtained by perturbing, by using the preset probability, the value $v_1$ recorded by the user equipment as $-v$ or $v$. The method further includes: separately collecting statistics on a first quantity $n_1$ of perturbed key-value pairs whose second values are $-v$ in the perturbed key-value pair data set and a second quantity $n_2$ of perturbed key-value pairs whose second values are $v$ in the perturbed key-value pair data set; and by using a first mean calibration model, calibrating the first quantity $n_1$ to obtain a third quantity $n_1^*$ and calibrating the second quantity $n_2$ to obtain a fourth quantity $n_2^*$, where the first mean calibration model is $$n_1^* = \frac{p-1}{2p-1} \cdot N + \frac{n_1}{2p-1}, n_2^* = \frac{p-1}{2p-1} \cdot N + \frac{n_2}{2p-1}, \text{ where } p = \frac{e^{\varepsilon_2}}{e^{\varepsilon_2}+1},$$

and $\varepsilon_2$ represents a privacy budget used for perturbing, by using the differential privacy model, the value in the user key-value pair data recorded by the user equipment.

Optionally, in an embodiment, the quantity of the third perturbed key-value pair data is N, and the method further includes: calibrating the third quantity $n_1^*$ and the fourth quantity $n_2^*$ if the third quantity $n_1^* > N$ or the fourth quantity $n_1^* < 0$, so that a sum of the third quantity $n_1^*$ and the fourth quantity $n_2^*$ is the quantity of the third perturbed key-value pair data.

There are many manners of enabling the sum of $n_1^*$ and $n_2^*$ to be equal to the quantity of the third perturbed key-value pair data in the foregoing. For example, when $n_1^* > N$, $n_1^* = N$ can be directly configured, and $n_2^* = 0$. For another example, when $n_1^* < 0$, $n_2^* = N$ can be directly configured, and $n_1^* = 0$.

A condition of determining the third quantity $n_1^* > N$ or the fourth quantity $n_1^* < 0$ may alternatively be replaced with the third quantity $n_2^* > N$ or the fourth quantity $n_2^* < 0$. This is not limited in this embodiment of this application.

The calibrating the third quantity $n_1^*$ and the fourth quantity $n_2^*$ if the third quantity $n_1^* > N$ or the fourth quantity $n_1^* < 0$ includes: calibrating the third quantity $n_1^*$ and the fourth quantity $n_2^*$ by using a second mean calibration model if the third quantity $n_1^* > N$ or the fourth quantity $n_1^* < 0$, where the second mean calibration model is $$n_1^* = \frac{(1+m)N}{2},$$

$n_2^* = N - n_1^*$, and m represents the pre-determined mean of the target key.

Table 3 shows a program procedure of collecting statistics on a statistical result according to an embodiment of this application. The program shown in Table 3 includes step 1 to step 13, where step 1 and step 2 are a process in which the user equipment perturbs the key-value pair data. For a specific perturbation method, refer to the foregoing description. For brevity, details are not described herein again. The following focuses on the method for collecting statistics on the statistical result by the data collector in step 3 to step 13.

TABLE 3

Algorithm 3 PrivKV

| | |
|---|---|
| Input: | All users' sets of KV pairs S = {$S_1, \ldots, S_n$}<br>The set of keys $\mathcal{K}$<br>Privacy budgets $\epsilon_1$ and $\epsilon_2$<br>Predefined mean vector m' |
| Output: | Frequency vector f*<br>Mean vector m* |

Procedure:
1: //User-side perturbation
2: Each user perturbs her set and sends the index j and
   $\langle k_j, v^* \rangle$ = LPP($S_i, \mathcal{K}, \epsilon_1, \epsilon_2$) to data collector
3: //Collector-side calibration
4: for each key k ∈ $\mathcal{K}$ do
5:   Collector calculates frequency $f_k^*$
6:   Collector calibrates the frequency as:

$$f_k^* = \frac{p - 1 + f_k^*}{2p - 1}, \text{ where } p = \frac{e^{\epsilon_1}}{e^{\epsilon_1} + 1}$$

7:   Collector counts 1 and −1 in the set of values:
     $n_1'$ = Count(1), $n_2'$ = Count(−1)
8:   N = $n_1' + n_2'$
9:   Collector calibrates the counts as:

$$n_1^* = \frac{p-1}{2p-1} \cdot N + \frac{n_1'}{2p-1}$$

$$n_2^* = \frac{p-1}{2p-1} \cdot N + \frac{n_2'}{2p-1}, \text{ where } p = \frac{e^{\epsilon_2}}{e^{\epsilon_2} + 1}$$

10:  if $n_1^*$ > N or $n_1^*$ < 0 then
11:  
$$n_1^* = \frac{(1 + m_k')N}{2}, n_2^* = N - n_1^*$$

12:  Collector calculates mean $m_k^* = \dfrac{n_1^* - n_2^*}{N}$

13: return f* and m*

In the method procedure shown in Table 3, parameters that need to be input include a key-value pair data set S, a first key set K, a privacy budget $\epsilon_1$, and a privacy budget $\epsilon_2$. The key-value pair data set S includes key-value pair data sent by each user equipment. The first key set includes keys of all key-value pair data that needs to be collected by the data collector. The privacy budget $\epsilon_1$ is a privacy budget used by the user equipment to perturb the key in the key-value pair data. The privacy budget $\epsilon_2$ is a privacy budget used by the user equipment to perturb the value in the key-value pair data.

Step 3: The data collector performs a calibration process.

Step 4: Perform a method in step 5 to step 12 for each key in the first key set K. For ease of description, the following step 5 and step 6 describe a calibration process of a kth key in the first key set. A calibration process of each key in the first key set may be performed according to step 5 and step 6.

Step 5: Collect statistics on frequency of the kth key in the first key set K and assign the frequency to a variable $f_k^*$.

Step 6: Calibrate the frequency of the kth key by using a frequency calibration model $$f_k^* = \frac{p - 1 + f}{2p - 1}, \text{ where } p = \frac{e^{\epsilon_1}}{e^{\epsilon_1} + 1},$$

and assign calibrated frequency to the variable $f_k^*$.

Step 7: The data collector collects statistics on a quantity of key-value pair data whose values are 1 in the key-value pair data set S, and assigns the quantity to a variable $n_1'$; and collects statistics on a quantity of key-value pair data whose values are −1 in the key-value pair data set S, and assigns the quantity to a variable $n_2'$.

Step 8: Collect statistics on a quantity of all key-value pair data included in the key-value pair data set S, and assign the quantity to a variable N.

Step 9: Calibrate $n_1'$ and $n_2'$ based on mean calibration models $$n_1^* = \frac{p-1}{2p-1} \cdot N + \frac{n_1}{2p-1} \text{ and } n_2^* = \frac{p-1}{2p-1} \cdot N + \frac{n_2}{2p-1}, \text{ where } p = \frac{e^{\epsilon_2}}{e^{\epsilon_2} + 1},$$

and assign a calibrated result of $n_1'$ to the variable $n_1^*$ and a calibrated result of $n_2'$ to the variable $n_2^*$.

Step 10: If $n_1^*$ f N or $n_1^*$ p 0, perform step 11; otherwise, perform step 12.

Step 11: Calibrate $n_1^*$ and $n_2^*$ based on formulas $$n_1^* = \frac{(1 + m_k')}{2}$$

and $n_2^* = N - n_1^*$, and assign calibrated values to the variables $n_1^*$ and $n_2^*$, so that a sum of $n_1^*$ and $n_2^*$ is N.

$m_k'$ may be a value randomly selected from [−1, 1].

Step 12: Determine a mean of values corresponding to the kth key based on a formula $$m_k^* = \frac{n_1^* - n_2^*}{N},$$

and assign the mean to a variable $m_k^*$.

Step 13: Return a vector f* and a vector m*. The vector f* and the vector m* separately include frequency of each key and a mean of values corresponding to each key in the first key set.

To improve precision of generating the statistical result by the data collector, the data collector may feed back a mean of values corresponding to different keys in a finally collected first key set to the user equipment, so that the user equipment re-perturbs the original key-value pair data by using the mean (applied to the second differential privacy model in the foregoing), and the data collector re-collects statistics based on the key-value pair data re-perturbed by the user equipment. That is, the user equipment performs a plurality of rounds of perturbation on the original key-value pair data, and correspondingly, the data collector collects a plurality of rounds of statistics on encrypted key-value pair data sent by the user equipment, so as to improve accuracy of the statistical result finally generated by the data collector. m represents a mean that is of values corresponding to each key in the first key set and that is determined in a statistical process of the mean in a (Q−1)th round, where Q is a positive integer greater than 1.

That is, in a statistical process of the mean in a Qth round, the mean m' of the values corresponding to the target key is determined based on a sum of the values corresponding to the target key and a quantity of occurrence times of the target key.

It should be noted that if the value of Q is 1, the Qth round, that is, the current round is the first round, no previous round of interaction provides a mean of values corresponding to each key in the first key set. Therefore, a mean may be randomly configured for the values corresponding to each key in the first key set within a range of [−1, 1].

Table 4 shows a program procedure of generating a statistical result according to another embodiment of this application. The program shown in FIG. 4 includes step 1 to step 6.

TABLE 4

Algorithm 4 PrivKVM: Iterative PrivKV

| Input: | All users' sets of KV pairs S = {S$_1$, ..., S$_n$} |
| | The set of keys $\mathcal{K}$ |
| | Privacy budget $\epsilon$ |
| | Number of iterations c |
| Output: | Frequency vector f$^{(1)}$ |
| | Mean vector m$^{(c)}$ |
| Procedure: | |
| 1: | Distribute privacy budget: |
| | $\{\epsilon_{11},...,\epsilon_{1c},\epsilon_{21},...,\epsilon_{2c}\}$ ← PBA($\epsilon$,c) |
| 2: | Initialize $\tilde{m}$ = −1 |
| 3: | for r = 1 to c do |
| 4: | f$^{(r)}$·m$^{(r)}$ = PrivKV(S,K,$\tilde{m}$,$\epsilon_{1r}$,$\epsilon_{2r}$) |
| 5: | Collector sends back $\tilde{m}$ = m$^{(r)}$ to each user |
| 6: | return f$^{(1)}$ and m$^{(c)}$ |

In the method procedure shown in Table 4, parameters that need to be input include a key-value pair data set S, a first key set K, a total privacy budget ε, and a quantity c of iterations (that is, the quantity of rounds in the foregoing). The key-value pair data set S includes key-value pair data sent by each user equipment. The first key set includes keys of all key-value pair data that needs to be collected by the data collector.

Step 1: Determine, based on a privacy budget allocation function PBA, a privacy budget used by each round of iteration.

Because a plurality of rounds are involved, privacy budget allocation needs to be considered. For example, ε is first evenly divided into two parts: $\varepsilon_1$ and $\varepsilon_2$, that is, $$\varepsilon_1 = \varepsilon_2 = \frac{\varepsilon}{2},$$

which are respectively used for key and value calibration. Because the data collector needs only one round of iteration to obtain a relatively accurate statistical result in process of collecting statistics on frequency, all of $\varepsilon_1$ can be used in the first round of frequency calibration process, that is, $\varepsilon_{11}=\varepsilon_1$, $\varepsilon_{12}=L=\varepsilon_{1c}=0$; then, $\varepsilon_2$ is evenly divided based on a quantity c of iterations, that is, $$\varepsilon_{21} = \varepsilon_{22}L = \varepsilon_{2c} = \frac{\varepsilon_2}{c},$$

which is used for value calibration in each round of iteration.

Step 2: In the first round of iteration process, set a mean of values of a kth key to −1, and assign the mean to a variable in $\tilde{m}$ (that is, $\tilde{m}$ in Table 3).

It should be noted that the mean of the values of the kth key may be further set to any value in [−1, 1].

Step 3: In a process from the first round of iteration to a cth round of iteration, perform step 4.

Step 4: Invoke the statistical process shown in Table 3, and use the parameters determined in steps 1-3 in the program shown in Table 3.

Step 5: The data collector sends a mean vector m to each user equipment, so that the user equipment re-perturbs key-value pair data based on the mean included in the mean vector.

Step 6: Return a vector f$^{(1)}$ and a vector m$^{(c)}$. f$^{(1)}$ represents frequency corresponding to each key in the first key set after one round of iteration, and m$^{(c)}$ represents a mean of values corresponding to each key in the first key set after c rounds of iterations.

In the foregoing plurality of rounds of interaction processes, a plurality of times of interaction are required between the data collector and the user equipment, which inevitably causes a communication cost. According to statistics, effect improvements of the statistical result are not always positively correlated to the plurality of rounds of interaction. Usually, after a specific quantity of rounds of interaction are performed, precision of the statistical result is improved to a bottleneck. If the interaction between the user equipment and the data collector is continued, a communication cost will be extremely high. However, if fewer rounds of interaction are performed between the data collector and the user equipment, the precision of the statistical result is affected, and a statistical precision loss of the statistical result is caused. Therefore, to make a trade-off between the statistical precision loss of the statistical result and the communication cost, in the statistical process of the mean in the Qth round, before the mean of the values corresponding to each key in the first key set is determined based on a sum of the values corresponding to each key in the first key set and a quantity of occurrence times of each key in the key-value pair set, whether to continue to perform a next round of communication is determined with reference to a current communication cost and the statistical precision loss of the statistical result.

That is, the mean of the target key is the mean of the target key that is obtained in a Qth round of statistical process, Q is a positive integer, and the sending the mean of the target key to the plurality of user equipments includes: if a communication cost $A_0$ is less than or equal to a statistical precision loss F, sending the mean of the target key to the plurality of user equipments, where the communication cost $A_0$ is used to indicate a communication cost of communication between the data collector and the user equipment, the statistical precision loss is $$F = \frac{1}{|K|}\sum_{k \in K}|m_1 - m_2|,$$

|K| represents a quantity of all keys to be collected by the data collector, $m_1$ represents the mean of the target key that is collected by the data collector, $m_2$ represents a mean of the target key that is historically collected by the data collector, and k represents the target key.

It should be noted that the statistical precision loss may be used to indicate a precision loss between a statistical result generated by the data collector and a statistical result generated based on the original key-value pair data if next round of interaction is not performed, for example, in the statistical process of the Qth round, a precision loss between a statistical result generated by the data collector in the Qth round and the statistical result generated based on the original key-value pair data.

Optionally, if the communication cost $A_0$ is greater than the statistical precision loss $F^*$, sending the mean of the target key that is collected by the data collector to the plurality of user equipments is stopped.

Table 5 shows a program procedure of generating a statistical result according to another embodiment of this application. The program shown in FIG. 5 includes step 1 to step 11.

TABLE 5

Algorithm 5 PrivKVM+: Adaptive PrivKVM

| | |
|---|---|
| Input: | All users' sets of KV pairs S = {$S_i$, ..., $S_n$} |
| | The set of keys $\mathcal{K}$ |
| | Privacy budget $\epsilon$ |
| | Communication cost of one iteration $A_0$ |
| Output: | Frequency vector f* |
| | Mean vector m* |
| Procedure: | |
| 1: | Allocate privacy budget: {$\epsilon_1$, $\epsilon_2$} ← PBA2($\epsilon$) |
| 2: | Initialize $\tilde{m}$ = −1 |
| 3: | f*, m* = PrivKV (S, $\mathcal{K}$, $\tilde{m}$, $\epsilon_1$, $\epsilon_2$) |
| 4: | Calculate the bias: $F^* = A_0 - \frac{1}{\|\mathcal{K}\|}\sum_{k \in \mathcal{K}} \|m_k^* - \tilde{m}_k\|$ |
| 5: | while F* < 0 do |
| 6: | Collector sends $\tilde{m}$ = m* to each user |
| 7: | $\epsilon = \epsilon - \epsilon_1 - \epsilon_2$ |
| 8: | {$\epsilon_1$, $\epsilon_2$} ← PBA2($\epsilon$) |
| 9: | f*, m* = PrivKV (S, $\mathcal{K}$, $\tilde{m}$, $\epsilon_1$, $\epsilon_2$) |
| 10: | $F^* = A_0 - \frac{1}{\|\mathcal{K}\|}\sum_{k \in \mathcal{K}} \|m_k^* - \tilde{m}_k\|$ |
| 11: | return f* and m* |

In the method procedure shown in Table 5, parameters that need to be input include a key-value pair data set S, a first key set K, a total privacy budget ε, and a communication cost $A_0$ required in each round of iteration. The key-value pair data set S includes key-value pair data sent by each user equipment. The first key set includes keys of all key-value pair data that needs to be collected by the data collector.

Step 1: Determine, based on a privacy budget allocation function PBA2, a privacy budget used by each round of iteration.

Because a plurality of rounds are involved, privacy budget allocation needs to be considered. For example, ε is first evenly divided into two parts: $\varepsilon_1$ and $\varepsilon_2$, that is, $$\varepsilon_1 = \varepsilon_2 = \frac{\varepsilon}{2},$$

which are respectively used for key and value calibration. Because the data collector needs only one round of iteration to obtain a relatively accurate statistical result in process of collecting statistics on frequency, all of $\varepsilon_1$ can be used in the first round of frequency calibration process, that is, $\varepsilon_{11}=\varepsilon_1$, $\varepsilon_{12}=L=\varepsilon_{1c}=0$; then, $\varepsilon_2$ is evenly divided based on a quantity c of iterations, that is, $$\varepsilon_{21} = \varepsilon_{22}L = \varepsilon_{2c} = \frac{\varepsilon_2}{c},$$

which is used for value calibration in each round of iteration.

It should be noted that the privacy budget allocation function used by the data collector is the same as the privacy algorithm allocation function used when the user equipment perturbs the key-value pair data. The privacy budget allocation function used by the user equipment and the privacy budget allocation function used by the data collector may be agreed in advance. Specifically, they may be agreed through signaling interaction, or may be pre-configured. This is not limited in this embodiment of this application.

Step 2: In the first round of iteration process, set a mean of values of a kth key to −1, and assign the mean to a variable $\tilde{m}$ (that is, $m_k$'in Table 3).

Step 3: Invoke the statistical process shown in Table 3, and use the parameters determined in steps 1 and 2 in the program shown in Table 3.

Step 4: Determine a difference between a statistical precision loss of the statistical result and the communication cost $A_0$. That is, $$F^* = A_0 - \frac{1}{|K|}\sum_{k \in K}\left|m_k^* - \overset{\circ}{m}_k\right|,$$

where |K| represents a quantity of all keys in the first key set.

Step 5: When F* p 0, perform step 6 to step 10.

Step 6: The data collector sends a mean vector m to each user equipment, so that the user equipment re-perturbs key-value pair data based on the mean included in the mean vector.

Correspondingly, after receiving the mean vector m, the user equipment searches the mean vector m for a mean that is in the mean vector m and that is corresponding to a key in the key-value pair data that needs to be reported by the user equipment, and uses the mean as a mean for perturbing the key-value pair data that needs to be reported. For a specific perturbation process, refer to the method shown in FIG. 2.

Step 7: Subtract the privacy budget used in each round of iteration process from the total privacy budget ε, and assign a remaining privacy budget to a variable ε.

Step 8: From the remaining privacy budget ε, re-allocate the privacy budgets $\varepsilon_1$ and $\varepsilon_2$ based on PBA2.

Step 9: Invoke the statistical process shown in Table 3, and use the parameters determined in the foregoing steps in the program shown in Table 3.

Step 10: Calculate a difference between the statistical precision loss of the statistical result and the communication cost $A_0$.

Step 11: Return a vector f* and a vector m*.

To improve precision of generating the statistical result by the data collector, a mean that is of the values corresponding to each key in the first key set and that may be obtained after the data collector interacts with the user equipment may be predicted based on the mean prediction model. In this way, a communication cost generated by communication between the data collector and the user equipment can be omitted. The mean prediction model is used to indicate a change trend of the mean of the values corresponding to each key in the first key set in a process of generating the statistical result in each round by the data collector. That is, in this embodiment of this application, the change trend of the mean of the values corresponding to each key in the first key set is simulated after communication between the data collector and the user equipment (that is, a virtual round), so as to determine the changed mean of the values corresponding to each key in the first key set.

That is, the mean prediction model is $$m^* = m + \frac{(m^{(1)} - m)(1 - \theta^c)}{1 - \theta}, \text{ where } \theta = \frac{f^*p - f^* - p + 1}{2f^*p - f^* - p + 1}, p = \frac{e^{\frac{\varepsilon_2}{2}}}{1 + e^{\frac{\varepsilon_2}{2}}},$$

c represents a quantity of rounds that the mean prediction model is used to predict the mean m* of the values corresponding to the target key, $\varepsilon_2$ represents a privacy budget used when the user equipment perturbs the value in the recorded user key-value pair data by using the differential privacy model, and $m^{(1)}$ represents an initial mean of the values corresponding to the target key.

The foregoing quantity of times of performing virtual rounds may be preset. In addition, in the foregoing process of improving the precision of generating the statistical result by the data collector by performing virtual rounds, the user equipment only needs to perform a data perturbation process on the key-value pair data once. That is, the privacy budget $\varepsilon_2$ may be completely used in the data perturbation process on the key-value pair data, so as to improve perturbation privacy of the key-value pair data.

Table 6 shows a program procedure of generating a statistical result according to another embodiment of this application. The program shown in FIG. 6 includes step 1 to step 6.

TABLE 6

| Algorithm 6 Executing Virtual Iterations |
|---|
| Input: All users' sets of KV pairs S = {$S_1$, ..., $S_n$} <br> The set of keys $\mathcal{K}$ <br> Privacy budget $\epsilon$ <br> Number of iterations to execute c |
| Output: Frequency vector f <br> Mean vector $m^{(c)}$ |
| Procedure: |
| 1: Initialize $\tilde{m}$ = −1 |
| 2: Set the frequency f and mean $m^{(1)}$: <br>     f, $m^{(1)}$ = PrivKV (S, $\mathcal{K}$, $\tilde{m}$, $\epsilon/2$, $\epsilon/2$) |
| 3: for each key k ∈ $\mathcal{K}$ do |
| 4:     Collector calculates $\theta = \frac{f_k p - f_k - p + 1}{2f_k p - f_k - p + 1}$, where $p = \frac{e^{\epsilon/2}}{1 + e^{\epsilon/2}}$ |
| 5:     Collector predicts $m_k^{(c)} = \tilde{m}_k + \frac{(m_k^{(1)} - \tilde{m}_k)(1 - \theta^c)}{1 - \theta}$ |
| 6: return f and $m^{(c)}$ |

In the method procedure shown in Table 6, parameters that need to be input include a key-value pair data set S, a first key set K, a total privacy budget $\varepsilon$, and a quantity c of iterations. The key-value pair data set S includes key-value pair data sent by each user equipment. The first key set includes keys of all key-value pair data that needs to be collected by the data collector.

Step 1: Set a mean of values of a kth key to −1, and assign the mean to a variable $\tilde{m}$ (that is, $m_k'$ in Table 3).

It should be noted that the mean of the values of the kth key may be further set to any value in [−1, 1].

Step 2: Invoke the method procedure shown in Table 3 based on the key-value pair data set S, the first key set K, the total privacy budget $\varepsilon$, and $\tilde{m}$.

Step 3: Perform step 4 and step 5 on each key in the first key set.

Step 4 and step 5: Predict the mean of the values corresponding to the kth key based on a mean prediction model $$m_k^{(c)} = m_k + \frac{(m_k^{(1)} - m_k)(1 - \theta^c)}{1 - \theta}, \text{ where } \theta =$$

$$\frac{f_k p - f_k - p + 1}{2f_k p - f_k - p + 1} \text{ and } p = \frac{e^{\frac{\varepsilon_2}{2}}}{1 + e^{\frac{\varepsilon_2}{2}}}.$$

Step 6: Return a vector f and a vector $m^{(c)}$, where $m^{(c)}$ represents a mean of values corresponding to each key in the first key set after c rounds of iterations.

Figure 8:
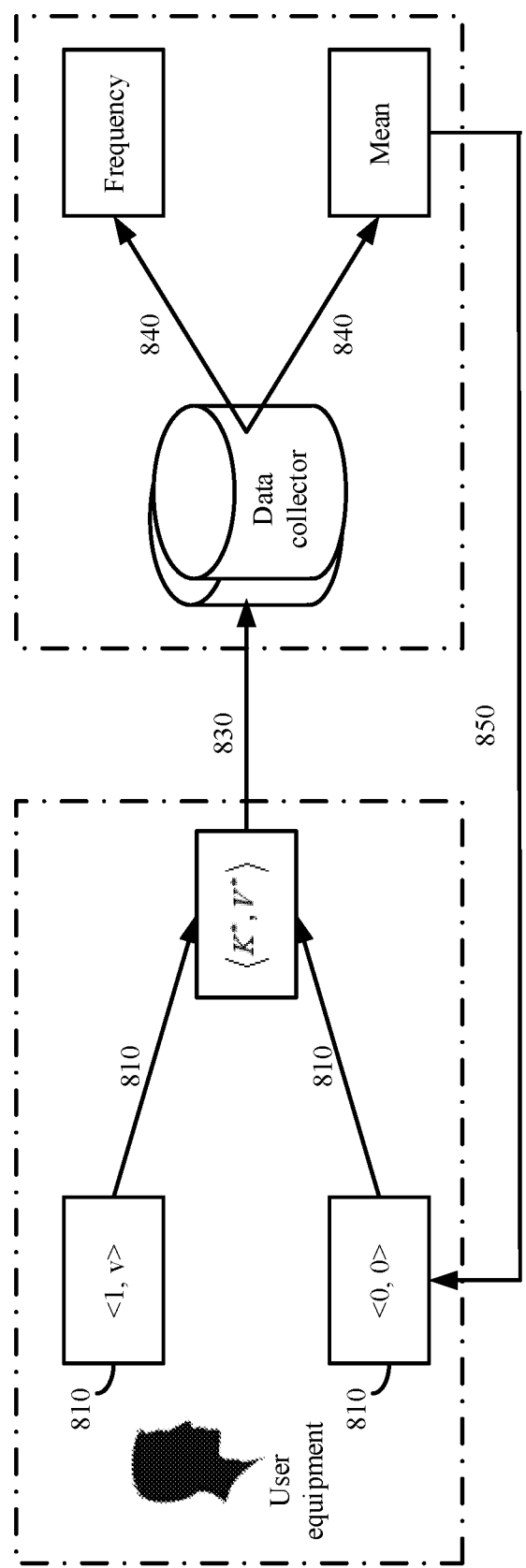
FIG. 8 is a schematic flowchart of a method for sending and collecting key-value pair data according to an embodiment of this application.

To further understand the method for sending user key-value pair data and the method for collecting statistics on user key-value pair data in the embodiments of this application, the following describes the methods in the embodiments of this application in terms of an overall method procedure with reference to FIG. 8. It should be understood that FIG. 8 shows only a specific implementation of the embodiments of this application, which sets no limitation on the scope of this application. In addition, a specific implementation of the method in FIG. 8 has been specifically described in the foregoing. For brevity, details are not described herein again.

FIG. 8 is a schematic flowchart of a method for sending user key-value pair data and a method for collecting statistics on user key-value pair data according to an embodiment of this application. The method shown in FIG. 8 includes step 810 to step 850.

810. Key-value pair data recorded by user equipment for a target key includes two types of data: $\langle 1,v \rangle$ and $\langle 0,0 \rangle$, where the target key represents a key to be obtained by a data collector.

In $\langle 1,v \rangle$, 1 indicates that the user equipment records the key-value pair data for the target key, and v indicates a value corresponding to the target key.

In $\langle 0,0 \rangle$, 0 indicates that the user equipment does not record the key-value pair data for the target key, and 0 indicates a value corresponding to the target key.

820. The user equipment perturbs the key-value pair data to obtain $\langle K^*,V^* \rangle$.

Specifically, when the key-value pair data is $\langle 1,v \rangle$, $\langle K^*, V^* \rangle$ may be obtained by using the foregoing first differential privacy model, and a value of $\langle K^*,V^* \rangle$ is $\langle 1,v \rangle$ or $\langle 0,0 \rangle$. When the key-value pair data is $\langle 0,0 \rangle$, $\langle K^*,V^* \rangle$ may be obtained by using the foregoing second differential privacy model, and a value of $\langle K^*,V^* \rangle$ is $\langle 0,0 \rangle$ or $\langle 1,v \rangle$. In this case, because the user equipment does not really record the key-value pair data, when the key-value pair data is perturbed from $\langle 0,0 \rangle$ to $\langle 1,v \rangle$, a preset value or a mean of values that are corresponding to the target key and historically collected by the data collector is used (for a specific process, refer to the value setting method for the "target value" in the foregoing).

830. The user equipment sends the perturbed key-value pair data $\langle K^*,V^* \rangle$ to the data collector.

840. The data collector generates a statistical result of the target key based on perturbed key-value pair data sent by a plurality of user equipments for the target key, where the statistical result includes frequency of the target key and a mean of values corresponding to the target key.

The data collector generates the statistical result for the perturbed key-value pair data reported by the plurality of user equipments for the target key, and each user equipment in the plurality of user equipments uses the perturbation method shown in steps 810 to 830 (for a specific perturbation process, refer to the method shown in FIG. 2) to perturb separately collected user key-value pair data as perturbed key-value pair data.

For a specific manner in which the data collector generates the statistical result based on the perturbed key-value pair data sent by the plurality of user equipments, refer to the foregoing method shown in FIG. 3.

850. The data collector sends the collected mean of the values corresponding to the target key to the plurality of user equipments, so that the plurality of user equipments re-perturb the key-value pair data based on the mean of the target key (that is, enter a next round of perturbation process).

In this embodiment of this application, the user equipment may re-perturb the user key-value pair data corresponding to the target key based on the mean of the target key that is sent by the data collector, so that perturbed key-value pair data generated current time is closer to a real value than perturbed key-value pair data previously generated by the user equipment. This helps improve precision of the statistical result generated by the data collector based on the perturbed key-value pair data.

The foregoing describes in detail the methods in the embodiments of this application with reference to FIG. 1 to FIG. 3 and FIG. 8. The following describes in detail apparatuses in the embodiments of this application with reference to FIG. 4 to FIG. 7. It should be noted that the apparatuses shown in FIG. 4 to FIG. 7 may implement the steps in the foregoing methods. For brevity, details are not described herein again.

Figure 4:
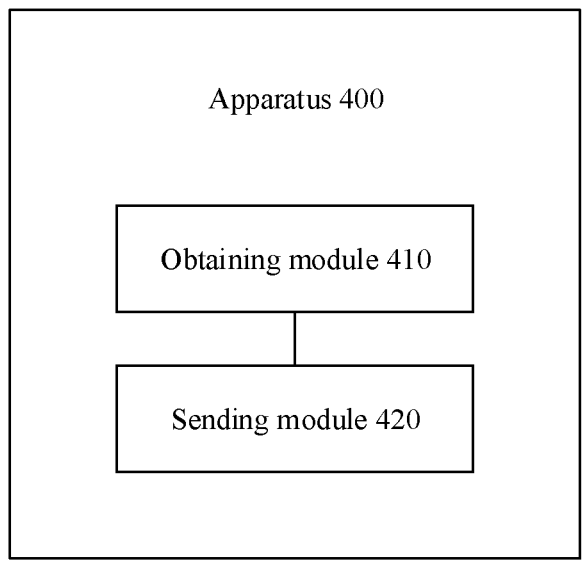
FIG. 4 is a schematic diagram of an apparatus for collecting key-value pair data according to an embodiment of this application.

FIG. 4 is a schematic diagram of an apparatus for collecting key-value pair data according to an embodiment of this application. An apparatus 400 shown in FIG. 4 may perform the method shown in FIG. 2 and the method steps implemented by the user equipment in the method shown in FIG. 3. The apparatus 400 includes an obtaining module 410 and a sending module 420.

The obtaining module 410 is configured to obtain first target key-value pair data $\langle k_1, v_1 \rangle$, where $k_1$ is a value of a key in the first target key-value pair data, and $v_1$ is a value of a value in the first target key-value pair data; and the sending module 420 is configured to send, to a data collector, first perturbed key-value pair data $\langle K_1^*, V_1^* \rangle$ obtained after the first target key-value pair data is perturbed, where a value of the first perturbed key-value pair data $\langle K_1^*, V_1^* \rangle$ is randomly set to $\langle a, v_1^* \rangle$ or $\langle b, v \rangle$ based on a preset probability, $v_1^*$ obtained by perturbing $v_1$, all of a, b, and v are preset values, and a and b are different values.

Optionally, randomly setting the value of the first perturbed key-value pair data $\langle k_1^*, V_1^* \rangle$ to $\langle a, v_1^* \rangle$ or $\langle b, v \rangle$ based on the preset probability includes: perturbing the first target key-value pair $\langle k_1, v_1 \rangle$ based on a privacy budget $\varepsilon_1$ and by using a first differential privacy model, to obtain the first perturbed key-value pair data $\langle K_1^*, V_1^* \rangle$, where the first differential privacy model is $$\langle K_1^*, V_1^* \rangle = \begin{cases} \langle a, v_1^* \rangle & w.p. \ \frac{e^{\varepsilon_1}}{1+e^{\varepsilon_1}} \\ \langle b, v \rangle & w.p. \ \frac{1}{1+e^{\varepsilon_1}} \end{cases}.$$

Optionally, the obtaining module 410 is further configured to select a target key from a first key set, where the first key set includes keys of all key-value pair data to be collected by the data collector; and when the target key belongs to a second key set, select, as the first target key-value pair data, key-value pair data that includes the target key from all key-value pair data recorded by the user equipment, where the second key set includes keys in all the key-value pair data recorded by the user equipment.

Optionally, the sending module 420 is further configured to: when the target key does not belong to the second key set, send second perturbed key-value pair data $\langle K_2^*, V_2^* \rangle$ to the data collector, where a value of the second perturbed key-value pair data $\langle K_2^*, V_2^* \rangle$ is randomly set to $\langle a, v_2^* \rangle$ or $\langle b, v \rangle$ based on the present probability, and $v_2^*$ is obtained by perturbing a preconfigured target value $v^2$.

Optionally, randomly setting the value of the second perturbed key-value pair data $\langle K_2^*, V_2^* \rangle$ to $\langle a, v_2^* \rangle$ or $\langle b, v \rangle$ based on the preset probability includes: perturbing second target key-value pair data based on the privacy budget $\varepsilon_1$ and by using a second differential privacy model, to obtain the second perturbed key-value pair data $\langle K_2^*, V_2^* \rangle$ where the second differential privacy model is $$\langle K_2^*, V_2^* \rangle = \begin{cases} \langle b, v \rangle & w.p. \ \frac{e^{\varepsilon_1}}{1+e^{\varepsilon_1}} \\ \langle a, v_2^* \rangle & w.p. \ \frac{1}{1+e^{\varepsilon_1}} \end{cases},$$

a key in the second target key-value pair data is the target key, and a value in the second target key-value pair data is $v^{2*}$.

Optionally, $\langle b, v \rangle$ is $\langle 0, 0 \rangle$, and a is a real number that is not zero.

Optionally, the apparatus further includes a receiving unit, configured to receive the target value $v_2$ returned by the data collector, where the target value $v_2$ is a mean of values that are corresponding to the target key and historically collected by the data collector.

Optionally, the obtaining unit is specifically configured to select the target key from the first key set through random sampling.

In an optional embodiment, the obtaining module 410 and the sending module 420 may be program modules implemented by using a computer program, and the program modules are configured to implement the method shown in FIG. 2.

In an optional embodiment, a function of the obtaining module 410 may be implemented through coordination between an input/output interface 530 and a processor 520 in user equipment 500. A function of the sending module 420 may be implemented through coordination between the input/output interface 530 and the processor 520 in the user equipment 500. A structure of the user equipment 500 is specifically shown in FIG. 5.

Figure 5:
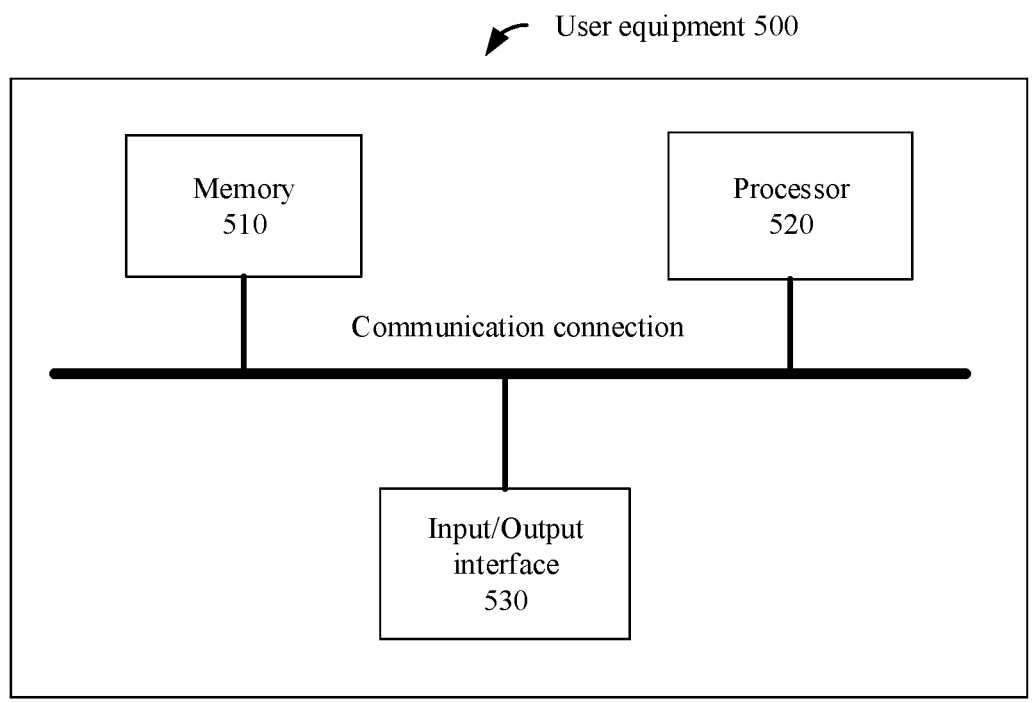
FIG. 5 is a schematic block diagram of user equipment according to an embodiment of this application.

It should be noted that the processor may be one or more processors, which is not limited in this embodiment of this application. FIG. 5 is a schematic block diagram of user equipment according to an embodiment of this application. The user equipment 500 shown in FIG. 5 may include a memory 510, the processor 520, and the input/output interface 530. The memory 510, the processor 520, and the input/output interface 530 are connected by using an internal connection channel. The memory 510 is configured to store a program instruction. The processor 520 is configured to execute the program instruction stored in the memory 520, to control the input/output interface 530 to receive entered data and information and output data such as an operation result.

It should be understood that, in this embodiment of this application, the processor 520 may be a universal central processing unit (CPU), a microprocessor, an application specific integrated circuit (ASIC), or one or more integrated circuits, and is configured to execute a related program, to implement the technical solution provided in this embodiment of this application.

The memory 510 may include a read-only memory and a random access memory, and provide an instruction and data to the processor 520. A part of the processor 520 may further include a non-volatile random access memory. For example, the processor 520 may further store information of a device type.

In an implementation process, steps in the foregoing methods can be implemented by using a hardware integrated logical circuit in the processor 520, or by using instructions in a form of software. The method of the communication disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 510, and a processor 520 reads information in the memory 510 and completes the steps in the foregoing methods in combination with hardware of the processor. To avoid repetition, details are not described herein again.

It should be understood that, the processor in the embodiments of the present disclosure may be a central processing unit (CPU), or may further be another general purpose processor, a digital signal processor (DSP), an application-specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

Figure 6:
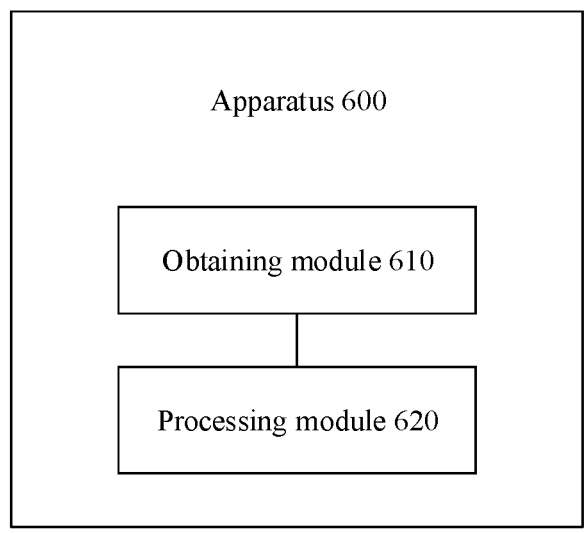
FIG. 6 is a schematic diagram of an apparatus for collecting key-value pair data according to an embodiment of this application.

FIG. 6 is a schematic diagram of an apparatus for collecting key-value pair data according to an embodiment of this application. An apparatus 600 shown in FIG. 6 may implement the method shown in FIG. 3 and the steps implemented by the data collector in the method shown in FIG. 2. The apparatus 600 includes a receiving module 610 and a processing module 620.

The receiving module 610 is configured to obtain a perturbed key-value pair data set, where the perturbed key-value pair data set includes a plurality of pieces of perturbed key-value pair data sent by a plurality of user equipments, the plurality of pieces of perturbed key-value pair data are used to collect statistics on frequency of a target key and a mean of values corresponding to the target key, each piece of perturbed key-value pair data includes a first value K* and a second value V*, a value of each piece of perturbed key-value pair data $\langle K^*, V^* \rangle$ is randomly set to $\langle a, v_1^* \rangle$ or $\langle b, v \rangle$ based on a preset probability, $v^*_1$ is obtained by perturbing a value $v_1$ recorded by the user equipment, all of a, b, and v are preset values, and a and b are different values;

the processing module 620 is configured to collect statistics on frequency of the target key in the key-value pair data set based on first values in the perturbed key-value pair data set; and the processing module 620 is further configured to collect statistics on a mean of values corresponding to the target key in the key-value pair data set based on second values in the perturbed key-value pair data set.

Optionally, the frequency of the target key is a ratio of a quantity of third perturbed key-value pair data to a quantity of the plurality of user equipments, and the third perturbed key-value pair data is perturbed key-value pair data whose first value K* is a in the perturbed key-value pair data set; and the mean of the values corresponding to the target key is a ratio of a sum of second values in the third perturbed key-value pair data to the quantity of the third perturbed key-value pair data.

Optionally, the processing module 620 is configured to: calibrate the frequency f of the target key based on a frequency calibration model to obtain calibrated frequency f* of the target key, where the frequency calibration model is $$f^* = \frac{p-1+f}{2p-1}, \text{ where } p = \frac{e^{\varepsilon_1}}{e^{\varepsilon_1}+1},$$

and $\varepsilon_1$ represents a privacy budget used for generating the perturbed key-value pair data based on a differential privacy model.

Optionally, the second value in the third perturbed key-value pair data is −v or v. The processing module 620 is configured to: separately collect statistics on a first quantity $n_1$ of perturbed key-value pairs whose second values are −v in the perturbed key-value pair data set and a second quantity $n_2$ of perturbed key-value pairs whose second values are v in the perturbed key-value pair data set; and by using a first mean calibration model, calibrate the first quantity $n_1$ to obtain a third quantity $n_1^*$, and calibrate the second quantity $n_2$ to obtain a fourth quantity $n_2^*$, where the first mean calibration model is $$n_1^* = \frac{p-1}{2p-1} \cdot N + \frac{n_1}{2p-1}, n_2^* = \frac{p-1}{2p-1} \cdot N + \frac{n_2}{2p-1}, \text{ where } p = \frac{e^{\varepsilon_2}}{e^{\varepsilon_2}+1},$$

and $\varepsilon_2$ represents a privacy budget used for perturbing the value in the recorded user key-value pair data by using the differential privacy model by the user equipment.

Optionally, the quantity of the third perturbed key-value pair data is N, and the processing module 620 is configured to: calibrate the third quantity $n_1^*$ and the fourth quantity $n_2^*$ if the third quantity $n_1^*>N$ or the fourth quantity $n_1^*<0$, so that a sum of the third quantity $n_1^*$ and the fourth quantity $n_2^*$ is the quantity of the third perturbed key-value pair data.

Optionally, the processing module 620 is configured to: calibrate the third quantity $n_1^*$ and the fourth quantity $n_2^*$ by using a second mean calibration model if the third quantity $n_1^* > N$ or the fourth quantity $n_1^* < 0$, where the second mean calibration model is $$n_1^* = \frac{(1+m)N}{2},$$

$n_2^* = N - n_1^*$, and m represents the pre-determined mean of the target key.

Optionally, the apparatus further includes a sending module, configured to send the mean of the target key to the plurality of user equipments.

Optionally, the mean of the target key is the mean of the target key that is obtained in a Qth round of statistical process, Q is a positive integer, and the sending module is configured to: if a communication cost $A_0$ is less than or equal to a statistical precision loss F, send the mean of the target key to the plurality of user equipments, where the communication cost $A_0$ is used to indicate a communication cost of communication between the data collector and the user equipment, the statistical precision loss is $$F = \frac{1}{|K|}\sum_{k \in K}|m_1 - m_2|,$$

|K| represents a quantity of all keys to be collected by the data collector, $m_1$ represents the mean of the target key that is collected by the data collector, $m_2$ represents a mean of the target key that is historically collected by the data collector, and k represents the target key.

Optionally, the sending module is configured to: if the communication cost $A_0$ is greater than the statistical precision loss F*, stop sending the mean of the target key that is collected by the data collector to the plurality of user equipments.

Optionally, the processing module is configured to: predict a predicted mean m* of values corresponding to the target key based on the mean m collected by the data collector and a mean prediction model, where the mean prediction model is used to indicate a change rule of the mean of the values corresponding to the target key in a process in which the data collector collects statistics on the mean of the values corresponding to the target key in a plurality of rounds of statistics collection.

Optionally, the mean prediction model is $$m^* = m + \frac{(m^{(1)} - m)(1 - \theta^c)}{1 - \theta}, \text{ where } \theta = \frac{f^*p - f^*p + 1}{2f^*p - f^* - p + 1}, p = \frac{e^{\frac{\varepsilon_2}{2}}}{1 + e^{\frac{\varepsilon_2}{2}}},$$

c represents a quantity of rounds that the mean prediction model is used to predict the mean m* of the values corresponding to the target key, $\varepsilon_2$ represents a privacy budget used when the user equipment perturbs the value in the recorded user key-value pair data by using the differential privacy model, and $m^{(1)}$ represents an initial mean of the values corresponding to the target key.

In an optional embodiment, the obtaining module 610 and the processing module 620 may be program modules implemented by using a computer program, and the program modules are configured to implement the method shown in FIG. 3.

In an optional embodiment, a function of the obtaining module 610 may be implemented through cooperation between an input/output interface 730 and a processor 720 in a data collector 700. A function of the processing module 620 may be implemented by the processor 720 in the data collector 700. A structure of the data collector 700 is specifically shown in FIG. 7.

It should be noted that the processor may be one or more processors, which is not limited in this embodiment of this application.

Figure 7:
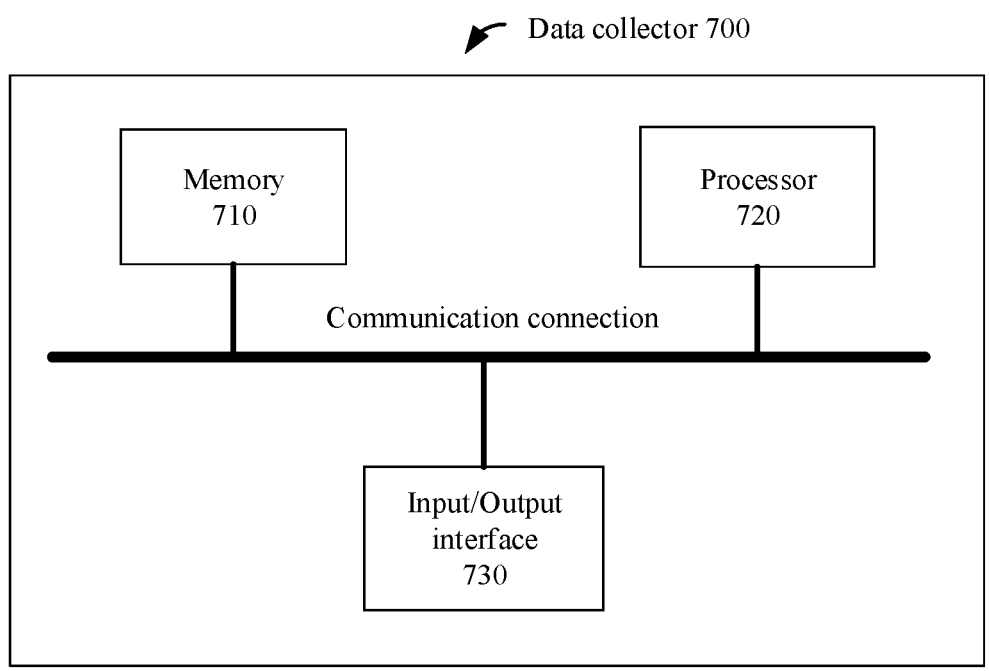
FIG. 7 is a schematic block diagram of a data collector according to an embodiment of this application.

FIG. 7 is a schematic block diagram of a data collector according to an embodiment of this application. The data collector 700 shown in FIG. 7 may include a memory 710, the processor 720, and the input/output interface 730. The memory 710, the processor 720, and the input/output interface 730 are connected by using an internal connection channel. The memory 710 is configured to store a program instruction. The processor 720 is configured to execute the program instruction stored in the memory 720, to control the input/output interface 730 to receive entered data and information and output data such as an operation result.

It should be understood that, in this embodiment of this application, the processor 720 may be a universal central processing unit (CPU), a microprocessor, an application specific integrated circuit (ASIC), or one or more integrated circuits, and is configured to execute a related program, to implement the technical solution provided in this embodiment of this application.

The memory 710 may include a read-only memory and a random access memory, and provide an instruction and data to the processor 720. A part of the processor 720 may further include a non-volatile random access memory. For example, the processor 720 may further store information of a device type.

In an implementation process, steps in the foregoing methods can be implemented by using a hardware integrated logical circuit in the processor 720, or by using instructions in a form of software. The method of the communication disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 710, and a processor 720 reads information in the memory 710 and completes the steps in the foregoing methods in combination with hardware of the processor. To avoid repetition, details are not described herein again.

It should be understood that, the processor in the embodiments of the present disclosure may be a central processing unit (CPU), or may further be another general purpose processor, a digital signal processor (DSP), an application-specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

It should be understood that in the embodiments of this application, "B corresponding to A" indicates that B is associated with A, and B may be determined according to A.

However, it should further be understood that determining A according to B does not mean that B is determined according to A only; that is, B may also be determined according to A and/or other information.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, a magnetic tape), an optical medium (for example, a digital versatile disc (DVD)), or a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for sending user key-value pair data, comprising:

obtaining, by a user equipment, first target key-value pair data $\langle k_1, v_1 \rangle$ wherein $k_1$ is a value of a key in the first target key-value pair data, and $v_1$ is a value of a value in the first target key-value pair data; and sending, by the user equipment, to a data collector, first perturbed key-value pair data $\langle K_1^*, V_1^* \rangle$ obtained after the first target key-value pair data is perturbed, wherein a value of the first perturbed key-value pair data $\langle K_1^*, V_1^* \rangle$ is randomly set to one of $\langle a, v_1^* \rangle$ or $\langle b, v \rangle$ based on a preset probability, $v_1^*$ is obtained by perturbing $v_1$, all of a, b, and v are preset values, and a and b are different values.

2. The method according to claim 1, wherein the obtaining first target key-value pair data $\langle k_1, v_1 \rangle$ comprises:

selecting a target key from a first key set, wherein the first key set comprises a key of key-value pair data to be collected by the data collector; and when the target key belongs to a second key set, selecting, as the first target key-value pair data, key-value pair data that comprises the target key from key-value pair data recorded by the user equipment, wherein the second key set comprises a key in the key-value pair data recorded by the user equipment.

3. The method according to claim 2, wherein the method further comprises:

when the target key does not belong to the second key set, sending second perturbed key-value pair data $\langle K_2^*, V_2^* \rangle$ to the data collector, wherein a value of the second perturbed key-value pair data $\langle K_2^*, V_2^* \rangle$ is randomly set to $\langle a, v_2^* \rangle$ or $\langle b, v \rangle$ based on the preset probability, and $v_2^*$ is obtained by perturbing a preconfigured target value $v_2$.

4. The method according to claim 1, wherein $\langle b, v \rangle$ is $\langle 0, 0 \rangle$, and a is a real number that is not zero.

5. The method according to claim 1, wherein the method further comprises:

receiving the target value $v_2$ returned by the data collector, wherein the target value $v_2$ is a mean of values that are corresponding to the target key and historically collected by the data collector.

6. The method according to claim 2, wherein the selecting a target key from a first key set comprises:

selecting the target key from the first key set through random sampling.

7. A method for collecting statistics on user key-value pair data, comprising:
 obtaining, by a data collector, a perturbed key-value pair data set, wherein the perturbed key-value pair data set comprises a plurality of pieces of perturbed key-value pair data sent by a plurality of user equipments, the plurality of pieces of perturbed key-value pair data are used to collect statistics on frequency of a target key and a mean of values corresponding to the target key, each piece of perturbed key-value pair data comprises a first value $K^*$ and a second value $V^*$, a value of each piece of perturbed key-value pair data $\langle K^*,V^* \rangle$ is randomly set to one of $\langle a,v_1^* \rangle$ or $\langle b,v \rangle$ based on a preset probability, $v^*_1$ is obtained by perturbing a value $v_1$ recorded by the user equipment, all of a, b, and v are preset values, and a and b are different values;
 collecting, by the data collector, statistics on frequency of the target key in the key-value pair data set based on first values in the perturbed key-value pair data set; and
 collecting, by the data collecttor, statistics on a mean of values corresponding to the target key in the key-value pair data set based on second values in the perturbed key-value pair data set.

8. The method according to claim 7, wherein the frequency of the target key is a ratio of a quantity of third perturbed key-value pair data to a quantity of the plurality of user equipments, and the third perturbed key-value pair data is perturbed key-value pair data whose first value $K^*$ is a in the perturbed key-value pair data set; and
 the mean of the values corresponding to the target key is a ratio of a sum of second values in the third perturbed key-value pair data to the quantity of the third perturbed key-value pair data.

9. The method according to claim 8, wherein the quantity of the third perturbed key-value pair data is N, and the method further comprises:
 calibrating the third quantity $n_1^*$ and the fourth quantity $n_2^*$ if the third quantity $n_1^* > N$ or the fourth quantity $n_1^* < 0$, so that a sum of the third quantity $n_1^*$ and the fourth quantity $n_2^*$ is the quantity of the third perturbed key-value pair data.

10. The method according to claim 7, wherein the method further comprises:
 sending the mean of the target key to the plurality of user equipments.

11. An apparatus for sending user key-value pair data, wherein the apparatus comprises at least one processor and a memory, the at least one processor is coupled to the memory, the memory is configured to store a computer program, and the processor is configured to invoke and run the computer program from the memory;
 obtaining first target key-value pair data $\langle k_1,v_1 \rangle$, wherein $k_1$ is a value of a key in the first target key-value pair data, and $v_1$ is a value of a value in the first target key-value pair data; and
 sending, to a data collector, first perturbed key-value pair data $\langle K_1^*,V_1^* \rangle$ obtained after the first target key-value pair data obtained by the obtaining module is perturbed, wherein
 a value of the first perturbed key-value pair data $\langle K_1^*,V_1^* \rangle$ is randomly set to $\langle a,v_1^* \rangle$ or $\langle b,v \rangle$ based on a preset probability, $v^*_1$ is obtained by perturbing $v_1$, all of a, b, and v are preset values, and a and b are different values.

12. The apparatus according to claim 11, wherein the steps further comprise:
 a target key from a first key set, wherein the first key set comprises a key of key-value pair data to be collected by the data collector; and
 when the target key belongs to a second key set, selecting, as the first target key-value pair data, key-value pair data that comprises the target key from key-value pair data recorded by the user equipment, wherein the second key set comprises a key in the key-value pair data recorded by the user equipment.

13. The apparatus according to claim 12, wherein the steps further comprise:
 when the target key does not belong to the second key set, send second perturbed key-value pair data $\langle K_2^*, V_2^* \rangle$ to the data collector, wherein a value of the second perturbed key-value pair data $\langle K_2^*,V_2^* \rangle$ is randomly set to $\langle a,v_2^* \rangle$ or $\langle b,v \rangle$ based on the preset probability, and $v_2^*$ is obtained by perturbing a pre-configured target value $v_2$.

14. The apparatus according to claim 11, wherein $\langle b,v \rangle$ is $\langle 0, 0 \rangle$, and a is a real number that is not zero.

15. The apparatus according to claim 11, wherein the steps further comprise:
 receiving the target value $v_2$ returned by the data collector, wherein the target value $v_2$ is a mean of values that are corresponding to the target key and historically collected by the data collector.

16. The apparatus according to claim 12, wherein the steps further comprise:
 selecting the target key from the first key set through random sampling.

17. An apparatus for collecting statistics on user key-value pair data, wherein the apparatus comprises at least one processor and a memory, the at least one processor is coupled to the memory, the memory is configured to store a computer program, and the processor is configured to invoke and run the computer program from the memory to perform steps comprising:
 obtaining a perturbed key-value pair data set, wherein the perturbed key-value pair data set comprises a plurality of pieces of perturbed key-value pair data sent by a plurality of user equipments, the plurality of pieces of perturbed key-value pair data are used to collect statistics on frequency of a target key and a mean of values corresponding to the target key, each piece of perturbed key-value pair data comprises a first value $K^*$ and a second value $V^*$, a value of each piece of perturbed key-value pair data $\langle K^*,V^* \rangle$ is randomly set to one of $\langle a,v_1^* \rangle$ or $\langle b,v \rangle$ based on a preset probability, $v^*_1$ is obtained by perturbing a value $v_1$ recorded by the user equipment, all of a, b, and v are preset values, and a and b are different values;
 collecting statistics on frequency of the target key in the key-value pair data set based on first values in the perturbed key-value pair data set obtained by the obtaining module; and
 collecting statistics on a mean of values corresponding to the target key in the key-value pair data set based on second values in the perturbed key-value pair data set obtained by the obtaining module.

18. The apparatus according to claim 17, wherein the frequency of the target key is a ratio of a quantity of third perturbed key-value pair data to a quantity of the plurality of user equipments, and the third perturbed key-value pair data is perturbed key-value pair data whose first value K* is a in the perturbed key-value pair data set; and the mean of the values corresponding to the target key is a ratio of a sum of second values in the third perturbed key-value pair data to the quantity of the third perturbed key-value pair data.

19. The apparatus according to claim 18, wherein the quantity of the third perturbed key-value pair data is N, and the steps further comprise:

calibrate the third quantity $n_1^*$ and the fourth quantity $n_2^*$ if the third quantity $n_1^* > N$ or the fourth quantity $n_1^* < 0$, so that a sum of the third quantity $n_1^*$ and the fourth quantity $n_2^*$ is the quantity of the third perturbed key-value pair data.

20. The apparatus according to claim 17, wherein the at least one processor is further configured to:

sending the mean of the target key to the plurality of user equipments.

* * * * *

UNITED STATES PATENT AND TRADEMARK OFFICE
CERTIFICATE OF CORRECTION

PATENT NO. : 11,615,099 B2  
APPLICATION NO. : 17/108780  
DATED : March 28, 2023  
INVENTOR(S) : Ye et al.

Page 1 of 1

It is certified that error appears in the above-identified patent and that said Letters Patent is hereby corrected as shown below:

In the Claims

Claim 11: Column 41, Line 49: "a memory, the at least one processor is coupled to the" should read -- a non-transitory memory, the at least one processor is coupled to the --.

Claim 11: Column 41, Line 52: "the computer program from the memory;" should read -- the computer program from the memory to perform steps comprising: --.

Claim 12: Column 42, Line 3: "a target key from a first key set, wherein the first key set" should read -- selecting a target key from a first key set, wherein the first key set --.

Claim 13: Column 42, Line 15: "send" should read -- sending --.

Claim 17: Column 42, Line 38: "processor and a memory, the at least one processor is" should read -- processor and a non-transitory memory, the at least one processor is --.

Signed and Sealed this  
Fourth Day of July, 2023

Katherine Kelly Vidal  
*Director of the United States Patent and Trademark Office*